(12) United States Patent
Ouderkirk et al.

(10) Patent No.: US 10,698,204 B1
(45) Date of Patent: Jun. 30, 2020

(54) IMMERSED HOT MIRRORS FOR ILLUMINATION IN EYE TRACKING

(71) Applicant: Facebook, Inc., Menlo Park, CA (US)

(72) Inventors: Andrew John Ouderkirk, Kirkland, WA (US); Brian Wheelwright, Sammamish, WA (US); Robin Sharma, Redmond, WA (US); Robert Dale Cavin, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/785,222

(22) Filed: Oct. 16, 2017

(51) Int. Cl.
| | |
|---|---|
| G02B 27/00 | (2006.01) |
| G02B 27/01 | (2006.01) |
| G02B 5/20 | (2006.01) |
| G02B 5/26 | (2006.01) |
| G02B 27/14 | (2006.01) |
| H04N 5/33 | (2006.01) |
| H04N 5/225 | (2006.01) |

(52) U.S. Cl.
CPC ......... *G02B 27/0093* (2013.01); *G02B 5/208* (2013.01); *G02B 5/26* (2013.01); *G02B 27/0172* (2013.01); *G02B 27/141* (2013.01); *H04N 5/2256* (2013.01); *H04N 5/332* (2013.01); *G02B 2027/014* (2013.01); *G02B 2027/0123* (2013.01); *G02B 2027/0138* (2013.01); *G02B 2027/0178* (2013.01)

(58) Field of Classification Search
CPC ...... G02B 27/0093; G02B 5/208; G02B 5/26; G02B 27/0172; G02B 27/141; G02B 2027/0123; G02B 2027/0138; G02B 2027/014; G02B 2027/0178; H04N 5/2256; H04N 5/332
See application file for complete search history.

(56) References Cited

U.S. PATENT DOCUMENTS

| | | | | |
|---|---|---|---|---|
| 7,522,344 | B1* | 4/2009 | Curatu | G02B 27/0093 345/8 |
| 9,555,589 | B1* | 1/2017 | Ambur | G02B 5/3025 |
| 10,228,561 | B2* | 3/2019 | Robbins | G02B 27/0172 |
| 2006/0061846 | A1* | 3/2006 | Sprague | G02B 26/0816 359/204.1 |
| 2012/0182398 | A1* | 7/2012 | Seo | A61B 3/1005 348/47 |
| 2013/0257689 | A1* | 10/2013 | Hotta | G02B 27/0172 345/8 |
| 2015/0235070 | A1* | 8/2015 | Wang | G06K 9/00006 382/115 |

(Continued)

*Primary Examiner* — Ricky Chin
(74) *Attorney, Agent, or Firm* — Matthew A. Pequignot; Evan J. Newman

(57) ABSTRACT

Disclosed herein are techniques for eye illumination for eye position tracking. An illuminator for eye illumination includes a light source, a substrate configured to be placed in front of an eye of a user, and at least one reflector located within the substrate. The light source is configured to emit light in a first wavelength range to illuminate the at least one reflector. The at least one reflector is configured to reflect the light in the first wavelength range to the eye of the user, and transmit light in a second wavelength range different from the first wavelength range. The substrate is transparent to both the light in the first wavelength range and the light in the second wavelength range.

19 Claims, 16 Drawing Sheets

(56) References Cited

U.S. PATENT DOCUMENTS

| | | | | |
|---|---|---|---|---|
| 2015/0236302 | A1* | 8/2015 | Gyoung | G02B 27/0101 257/40 |
| 2015/0242680 | A1* | 8/2015 | Thukral | G06K 9/00335 348/78 |
| 2015/0253469 | A1* | 9/2015 | Le Gros | G02B 3/0056 359/619 |
| 2015/0370040 | A1* | 12/2015 | Georgiev | G06T 3/4038 348/218.1 |
| 2016/0007849 | A1* | 1/2016 | Krueger | A61B 3/113 600/301 |
| 2016/0295202 | A1* | 10/2016 | Evans | H04N 13/363 |
| 2017/0068311 | A1* | 3/2017 | Evans | G06F 3/011 |
| 2017/0082858 | A1* | 3/2017 | Klug | A61B 3/14 |
| 2017/0090562 | A1* | 3/2017 | Gustafsson | G06K 9/00604 |
| 2017/0160798 | A1* | 6/2017 | Lanman | G06T 5/002 |
| 2017/0227764 | A1* | 8/2017 | Kim | G02B 27/141 |
| 2017/0227773 | A1* | 8/2017 | Aksit | G02B 27/0172 |
| 2017/0262020 | A1* | 9/2017 | Patel | G02B 27/0172 |
| 2017/0365101 | A1* | 12/2017 | Samec | G06T 19/006 |
| 2018/0008141 | A1* | 1/2018 | Krueger | A61B 5/744 |
| 2018/0124364 | A1* | 5/2018 | Yata | H04N 9/3167 |
| 2018/0157909 | A1* | 6/2018 | Ollila | H04N 9/3173 |
| 2018/0239145 | A1* | 8/2018 | Lanman | G06F 3/013 |
| 2018/0255278 | A1* | 9/2018 | Tardif | G02B 27/0172 |
| 2018/0275409 | A1* | 9/2018 | Gao | H04N 13/332 |
| 2018/0278924 | A1* | 9/2018 | Schowengerdt | H04N 13/383 |
| 2018/0314325 | A1* | 11/2018 | Gibson | G06F 3/013 |
| 2018/0356638 | A1* | 12/2018 | Yang | G02B 27/0172 |
| 2019/0018485 | A1* | 1/2019 | Aleem | G06F 3/147 |
| 2019/0025582 | A1* | 1/2019 | Morohashi | B60R 11/0229 |
| 2019/0056599 | A1* | 2/2019 | Reshidko | G02B 26/0833 |
| 2019/0064526 | A1* | 2/2019 | Connor | G02B 6/0076 |
| 2019/0064922 | A1* | 2/2019 | Price | G01S 7/4861 |
| 2019/0101978 | A1* | 4/2019 | Iseringhausen | G06F 3/013 |
| 2019/0311527 | A1* | 10/2019 | Schwab | G02B 27/0093 |
| 2020/0014891 | A1* | 1/2020 | Suzuki | G02B 17/0804 |
| 2020/0050008 | A1* | 2/2020 | Seo | G02B 27/0983 |

\* cited by examiner

IMMERSED HOT MIRRORS FOR ILLUMINATION IN EYE TRACKING

BACKGROUND

An artificial reality system generally includes a display panel configured to present artificial images that depict objects in a virtual environment. The display panel may display virtual objects or combine real objects with virtual objects, as in virtual reality (VR), augmented reality (AR), or mixed reality (MR) applications. To interact with the artificial reality system, a user may need to provide inputs directed to at least a portion of the displayed image. Some artificial reality systems may include a dedicated input/output interface for receiving user inputs, such as hand and/or finger movements. However, traditional input/output interfaces may require frequent and active user inputs, and thus may prevent the user from having a fully immersive experience in the artificial reality environment.

An eye-tracking system can track the gaze of an artificial reality (e.g., VR/AR/MR) system so that the artificial reality system knows where the user is looking, and thus can provide a more immersive interface than a typical input/output interface predominantly reliant on a handheld peripheral input/output device. Eye-tracking may also be used for foveated imaging, foveated transmission of image data, alertness monitoring, etc. Existing eye-tracking systems may use light sources (e.g., infrared light) positioned at the periphery of the user's field of view to illuminate the eye, where the light illuminating the eye may be reflected specularly by the cornea of the user's eye, resulting in "glints" in a captured image of the eye. The position (e.g., gaze direction or rotation position) of the eye may be determined based on, for example, the location of the glints relative to a known feature of the eye (e.g., center of the pupil) in the captured image.

There may be several issues associated with existing eye tracking technologies. One of the issues is the size of the glints in the captured image for a light source that may not be a "point source." For example, an LED which may be used as the light source may have an emission area with a diameter of 200 microns or more. Thus, when the whole LED emission area is captured, the glint may not appear as a point in the captured image. Consequently, the center location of the glint in the image may not be precisely determined, and the errors in the approximation may lead to errors in the eye tracking result. In addition, the peripheral location of the light sources may negatively impact the accuracy of the eye tracking due to, for example, the angles of the illuminating light from the light sources to the eye. While a larger number of light sources in the periphery of the user's field of view may help to increase the accuracy of eye tracking, increasing the number of light sources likely would cause a large amount of power consumption, especially for devices designed for extended use.

SUMMARY

The present disclosure generally relates to eye tracking in near-eye display devices. In certain embodiments, reflectors or mirrors (e.g., dichroic mirrors such as hot mirrors) immersed in a transparent substrate that can be positioned in front of a user and within the user's field of view may be used to provide reflected illumination of the user's eye for eye tracking. The mirrors may reflect the light for eye tracking while allowing visible light to pass through.

In some embodiments, an eye-tracking unit for a near-eye display device may include a light source, a camera, a substrate configured to be placed in front of an eye of a user, and at least one reflector located within the substrate. The light source may be configured to emit light in a first wavelength range to illuminate the at least one reflector. The at least one reflector may be configured to reflect the light in the first wavelength range to the eye of the user, and transmit light in a second wavelength range from a display panel of the near-eye display device to the eye of the user. The camera may be configured to receive light in the first wavelength range and reflected by the eye of the user. The substrate may be transparent to both the light in the first wavelength range and the light in the second wavelength range.

In some embodiments of the eye-tracking unit, the light source and the camera may be coupled to or embedded in a body of the near-eye display device. In some implementations, the substrate may be a part of the display panel of the near-eye display device. In some embodiments, the eye-tracking unit may also include an imaging reflector located within the substrate. The imaging reflector may be configured to receive light in the first wavelength range reflected by the eye of the user, reflect the light in the first wavelength range reflected by the eye of the user to the camera, and transmit the light in the second wavelength range from the display panel of the near-eye display device to the eye of the user. In some embodiments, the at least one reflector may include a plurality of reflectors, where the light source may be configured to illuminate the plurality of reflectors with the light in the first wavelength range. Each of the plurality of reflectors may be configured to reflect the light in the first wavelength range from the light source to a different area of the eye, and transmit the light in the second wavelength range from the display panel of the near-eye display device to the eye of the user.

In certain embodiments, an illuminator for eye tracking is disclosed. The illuminator may include a light source, a substrate configured to be placed in front of an eye of a user, and at least one reflector located within the substrate. The light source may be configured to emit light in a first wavelength range to illuminate the at least one reflector. The at least one reflector may be configured to reflect the light in the first wavelength range to the eye of the user, and transmit light in a second wavelength range different from the first wavelength range. The substrate may be transparent to both the light in the first wavelength range and the light in the second wavelength range. In some implementations, the light source may include a laser, a light-emitting diode, or a lamp. In some implementations, the substrate may include a curved surface. In some implementations, the substrate may include at least one of a glass, quartz, plastic, polymer, ceramic, or crystal.

In some implementations of the illuminator, the first wavelength range may include a near infrared range, the second wavelength range may include a visible range for a human eye, and the at least one reflector may include at least one hot mirror. The at least one hot mirror may be configured to reflect light in the near infrared range and transmit light in the visible range. In some implementations, the at least one reflector may include a reflecting surface, where the reflecting surface may be configured such that a virtual image of the light source formed by the reflecting surface may be at a predetermined location in front of the eye of the user. In some implementations, the reflecting surface may include a flat surface, a concave surface, a convex surface, a cylindrical surface, an aspherical surface, or a freeform surface. In some implementations, the at least one reflector may include a plurality of dielectric layers, a diffractive optical element, or a reflective material layer at the reflecting surface.

In some implementations of the illuminator, the at least one reflector may include a plurality of reflectors. The light source may be configured to illuminate the plurality of reflectors with the light in the first wavelength range. Each of the plurality of reflectors may be configured to reflect the light in the first wavelength range from the light source to a different area of the eye, and transmit the light in the second wavelength range. In some implementations, each of the plurality of reflectors may be different from other reflectors of the plurality of reflectors in at least one of surface curvature, surface orientation, size, or location in the substrate. In some implementations, each reflector of the plurality of reflectors may include a reflecting surface, and the reflecting surface of each reflector of the plurality of reflectors may be configured such that a virtual image of the light source formed by the reflecting surface of each reflector of the plurality of reflectors may be at a different location in front of the eye of the user.

In certain embodiments, a method of tracking an eye of a user of a near-eye display is disclosed. The method may include illuminating, by light in a first wavelength range emitted from a light source, a first reflector within a substrate in front of the eye of the user; reflecting, by the first reflector, the light in the first wavelength range to a first area of the eye of the user; and transmitting light in a second wavelength range from a display panel of the near-eye display through the substrate and the first reflector and to the eye of the user. In some implementations, the method may further include receiving, by a camera, light in the first wavelength range reflected by the eye of the user; and generating, by the camera using the received light in the first wavelength range reflected by the eye of the user, an image frame comprising an image of the light source reflected by the eye of the user.

In some embodiments, the method may further include receiving, by a second reflector within the substrate, light in the first wavelength range reflected by the eye of the user; reflecting, by the second reflector, the received light in the first wavelength range reflected by the eye of the user, to a camera; and transmitting the light in the second wavelength range from the display panel of the near-eye display through the substrate and the second reflector and to the eye of the user. In some embodiments, the method may further include illuminating, by the light in the first wavelength range emitted from the light source, a third reflector within the substrate; reflecting, by the third reflector, the light in the first wavelength range to a second area of the eye of the user; and transmitting the light in the second wavelength range from the display panel of the near-eye display through the substrate and the third reflector to the eye of the user.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

Figure 1:
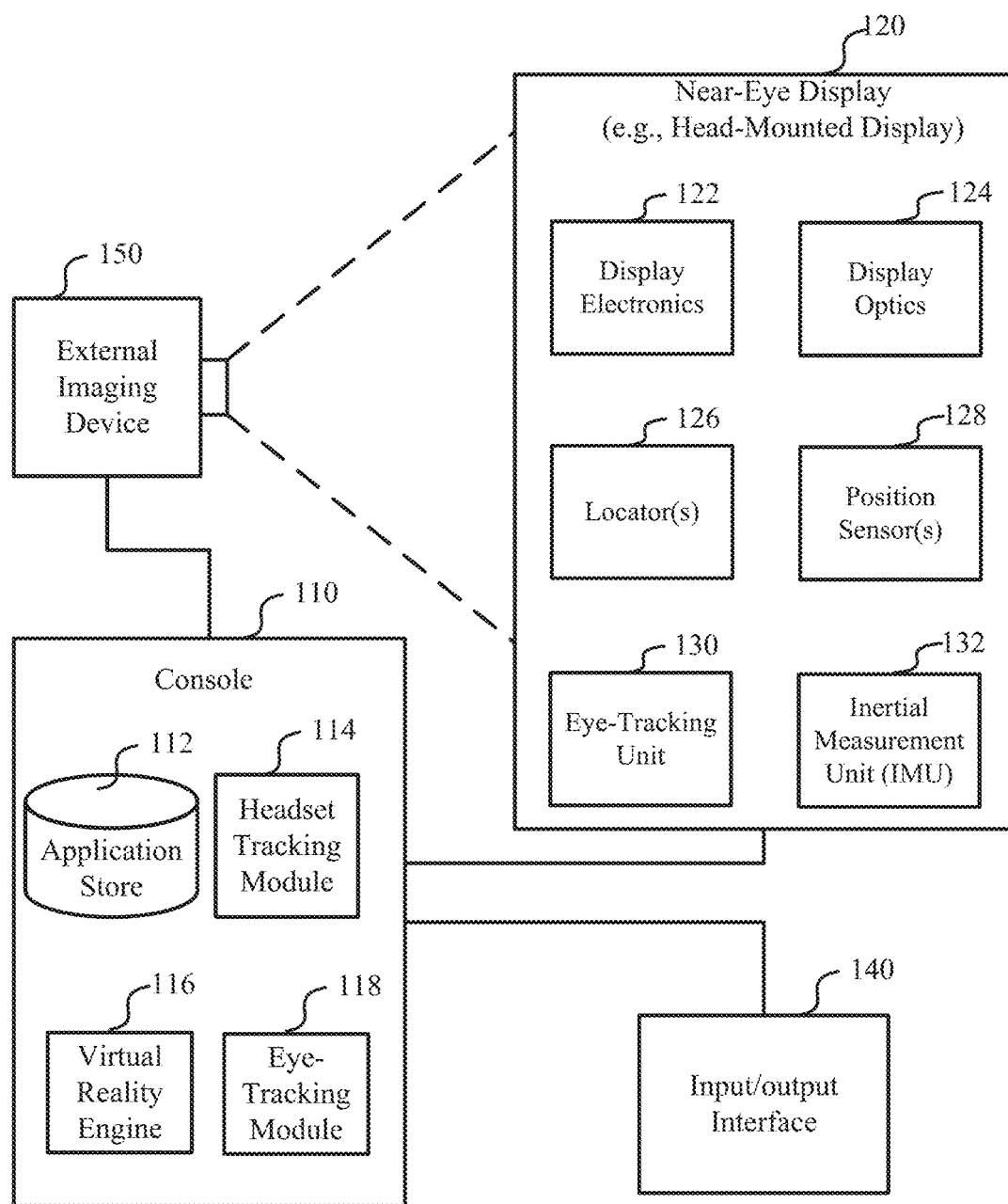
FIG. 1 is a simplified block diagram of an example artificial reality system environment including a near-eye display, according to certain embodiments.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

As used herein, visible light may refer to light with a wavelength between about 380 nm to about 750 nm. Near infrared (NIR) light may refer to light with a wavelength between about 750 nm to about 2500 nm. The desired infrared (IR) wavelength range may refer to the wavelength range of IR light that can be detected by a suitable IR sensor (e.g., a complementary metal-oxide semiconductor (CMOS) or a charge-coupled device (CCD) sensor), such as between 830 nm and 860 nm or between 930 nm and 980 nm.

As also used herein, a substrate may refer to a medium within which an array of mirrors is immersed. The substrate may include one or more types of dielectric materials, such as glass, quartz, plastic, polymer, poly(methyl methacrylate) (PMMA), crystal, or ceramic. At least one type of material of the substrate may be transparent to visible light and NIR light. A thickness of the substrate may range from, for example, less than about 1 mm to about 10 mm or more. As used herein, a material may be "transparent" to a light beam if the light beam can pass through the material with a high transmission rate, such as larger than 60%, 75%, 80%, 90%, 95%, 98%, 99%, or higher, where a small portion of the light beam (e.g., less than 40%, 25%, 20%, 10%, 5%, 2%, 1%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

As used herein, a reflector for a wavelength range may refer to an optical device that can reflect at least 30%, at least 50%, at least 70%, or more of incident light in the wavelength range. Some reflectors may reflect less than 20%, less than 10%, less than 5%, less than 1%, or less of incident light outside the working wavelength range of the reflectors. The reflectivity may be represented by either a photopically weighted or an unweighted average reflectivity over a wavelength range, or the lowest reflectivity over a wavelength range, such as the NIR wavelength range. A reflector may include a mirror having metallic coatings or dielectric thin films.

Hot mirror coating may refer to an optical coating through which the visible light may be transmitted substantially unaffected, whereas the near infrared light or infrared light may be reflected. A hot mirror may refer to a specialized dichromatic beam splitter (also referred to as dichroic mirror) that may reflect infrared light, while allowing visible light to pass through. Hot mirrors may be designed to be inserted into an optical system at an incidence angle varying between, for example, zero and about 45 degrees, and may be useful in a variety of applications, such as applications where the buildup of heat can damage components or adversely affect spectral characteristics of the illumination source. Wavelengths of light that may be reflected by an infrared hot mirror may range from, for example, about 750 nm to about 2500 nm or longer.

An artificial reality system, such as a virtual reality (VR), augmented reality (AR), or mixed reality (MR) system, may include a near-eye display (e.g., a headset or a pair of glasses) configured to present content to a user via an electronic or optic display and, in some cases, may also include a console configured to generate content for presentation to the user and to provide the generated content to the near-eye display for presentation. To improve user interaction with presented content, the console may modify or generate content based on a location where the user is looking, which may be determined by tracking the user's eye. Tracking the eye may include tracking the position and/or shape of the pupil of the eye, and/or the rotational position (gaze direction) of the eye. To track the eye, the near-eye display may illuminate a surface of the user's eye using light sources mounted to or within the near-eye display. An imaging device (e.g., a camera) included in the near-eye display may then capture light reflected by various surfaces of the user's eye. Light that is reflected specularly off the cornea of the user's eye may result in "glints" in the captured image. One way to illuminate the eye to see the pupil as well as the glints is to use a two-dimensional (2D) array of light-emitting diodes (LEDs). These LEDs may be placed at the periphery of the user's field of view (e.g., along the circumference of the viewing optics). Techniques such as centroiding algorithm may be used to accurately determine the locations of the glints on the eye in the captured image, and the rotational position (e.g., the gaze direction) of the eye may then be determined based on the locations of the glints relative to a known feature of the eye (e.g., the center of the pupil) within the captured image.

The imaging device (e.g., an eye-tracking camera) effectively captures images (glints) of the light sources (e.g., LEDs) positioned at the periphery of the user's field of view to provide light that may be reflected specularly by the cornea of the eye. Because the emission area of an LED may be fairly large, a light source used for eye illumination may be an extended source rather than a point source. Consequently, if the eye-tracking camera has a direct view of the eye (without any diffusing elements in the optical path), the glint may not appear as a point in the captured image, and the spatial structure within the emission area of the light source may be captured by the camera. The spatial structure captured in the image of the light source may cause errors when determining the relative location of the glint in the image using, for example, the centroiding algorithm, which may determine the center of the glint by finding the pixel location with the most energy in a local neighborhood. The errors may affect the accuracy of eye tracking when the relative location of the glint in the image is used to determine the corneal location in three-dimensional (3D) space.

In addition, the peripheral location of the light sources may negatively impact the accuracy of the eye tracking due to, for example, the angles of the illuminating light from the light sources to the eye. While a larger number of light sources in the periphery of the user's field of view may help to increase the accuracy of eye tracking, increasing the number of light sources likely would cause a large amount of power consumption, especially for devices designed for extended use.

To overcome these problems associated with existing techniques for eye tracking, techniques disclosed herein use a plurality of mirrors (e.g., hot mirrors or other dichroic mirrors) immersed in a transparent substrate that may be positioned in front of the user and within the user's field of view to illuminate the eye. Each mirror may reflect light in one portion of the spectrum (e.g., IR light or NIR light) and refract (transmit) light in another portion of the spectrum (e.g., visible light). Because visible light is allowed to pass through the mirrors and the substrate, the mirrors can be positioned in front of the user's eyes without obstructing the user's field of view. For example, in an AR application, the user can look through the substrate and the immersed mirrors to see the outside world. In a VR application, the user can look through the substrate and the immersed mirrors to view the displayed content. At the same time, light (e.g., NIR light) from a light source for eye illumination can be reflected by the mirrors and reach the user's cornea to form glints used in eye tracking.

In various implementations, the surface of each mirror may have a shape that is flat, concave, convex, cylindrical, spherical, aspherical, anamorphic, freeform, etc. In one example, the surface of a mirror may be concave, and thus the mirror may focus the light from the light source. This effectively makes the light source appear more like a point source and reduces the size of the resulting glint in the captured image. A smaller glint size in the captured image may lead to a more precise glint location detection and more accurate eye tracking. In addition, the use of the mirrors for light reflection allows a light source to appear as if it is placed in front of the eye (as opposed to at the periphery of the field of view of the eye), which may also help to improve the accuracy of eye tracking. Furthermore, the use of the mirrors allow multiple glints to be generated using a single light source, which may further improve eye tracking accuracy without incurring the cost of multiple light sources and high power consumption associated with increasing the number of light sources.

FIG. 1 is a simplified block diagram of an example artificial reality system environment 100 including a near-eye display 120, in accordance with certain embodiments. Artificial reality system environment 100 shown in FIG. 1 may include near-eye display 120, an external imaging device 150, and an input/output interface 140 that are each coupled to a console 110. While FIG. 1 shows example artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In alternative configurations, different or additional components may be included in artificial reality system environment 100.

Near-eye display 120 may be a head-mounted display that presents content to a user. Examples of content presented by near-eye display 120 include one or more of images, videos, audios, or some combination thereof. In some embodiments, audios may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form factor, including a pair of glasses. Some embodiments of near-eye display 120 are further described below with respect to FIGS. 2, 3, and 15. Additionally, in various embodiments, the functionality described herein may be used in a headset that combines images of an environment external to near-eye display 120 and content received from console 110, or from any other console generating and providing content to a user. Therefore, near-eye display 120, and methods for eye tracking described herein, may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, one or more locators 126, one or more position sensors 128, an eye-tracking unit 130, and an inertial measurement unit (IMU) 132. Near-eye display 120 may omit any of these elements or include additional elements in various embodiments. Additionally, in some embodiments, near-eye display 120 may include elements combining the function of various elements described in conjunction with FIG. 1.

Display electronics 122 may display images to the user according to data received from console 110. In various embodiments, display electronics 122 may include one or more display panels, such as a liquid crystal display (LCD), an organic light emitting diode (OLED) display, a micro light emitting diode (mLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include sub-pixels to emit light of a predominant color such as red, green, blue, white, or yellow. In some implementations, display electronics 122 may display a 3D image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), or magnify image light received from display electronics 122, correct optical errors associated with the image light, and present the corrected image light to a user of near-eye display 120. In various embodiments, display optics 124 may include one or more optical elements. Example optical elements may include a substrate, optical waveguides, an aperture, a Fresnel lens, a convex lens, a concave lens, a filter, or any other suitable optical element that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. In some embodiments, display optics 124 may have an effective focal length larger than the spacing between display optics 124 and display electronics 122 to magnify image light projected by display electronics 122. The amount of magnification of image light by display optics 124 may be adjusted by adding or removing optical elements from display optics 124.

Display optics 124 may be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism. In some embodiments, content provided to display electronics 122 for display may be pre-distorted, and display optics 124 may correct the distortion when it receives image light from display electronics 122 generated based on the pre-distorted content.

Locators 126 may be objects located in specific positions on near-eye display 120 relative to one another and relative to a reference point on near-eye display 120. Console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

In some embodiments, locators 126 may be located beneath an outer surface of near-eye display 120. A portion of near-eye display 120 between a locator 126 and an entity external to near-eye display 120 (e.g., external imaging device 150, a user viewing the outer surface of near-eye display 120) may be transparent to the wavelengths of light emitted or reflected by locators 126 or is thin enough to not substantially attenuate the light emitted or reflected by locators 126. In some embodiments, the outer surface or other portions of near-eye display 120 may be opaque in the visible band, but is transparent in the IR band, and locators 126 may be under the outer surface and may emit light in the IR band.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more imaging devices configured to capture eye tracking data, which an eye-tracking module 118 in console 110 may use to track the user's eye. Eye tracking data may refer to data output by eye-tracking unit 130. Example eye tracking data may include images captured by eye-tracking unit 130 or information derived from the images captured by eye-tracking unit 130. Eye tracking may refer to determining an eye's position, including orientation and location of the eye, relative to near-eye display 120. For example, eye-tracking module 118 may output the eye's pitch and yaw based on images of the eye captured by eye-tracking unit 130. In various embodiments, eye-tracking unit 130 may measure electromagnetic energy reflected by the eye and communicate the measured electromagnetic energy to eye-tracking module 118, which may then determine the eye's position based on the measured electromagnetic energy. For example, eye-tracking unit 130 may measure electromagnetic waves such as visible light, infrared light, radio waves, microwaves, waves in any other part of the electromagnetic spectrum, or a combination thereof reflected by an eye of a user.

Eye-tracking unit 130 may include one or more eye-tracking systems. An eye-tracking system may include an imaging system to image one or more eyes and may optionally include a light emitter, which may generate light that is directed to an eye such that light reflected by the eye may be captured by the imaging system. For example, eye-tracking unit 130 may include a coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

In some embodiments, eye-tracking unit 130 may include one light emitter and one camera to track each of the user's eyes. Eye-tracking unit 130 may also include different eye-tracking systems that operate together to provide improved eye tracking accuracy and responsiveness. For example, eye-tracking unit 130 may include a fast eye-tracking system with a fast response time and a slow eye-tracking system with a slower response time. The fast eye-tracking system may frequently measure an eye to capture data used by eye-tracking module 118 to determine the eye's position relative to a reference eye position. The slow eye-tracking system may independently measure the eye to capture data used by eye-tracking module 118 to determine the reference eye position without reference to a previously determined eye position. Data captured by the slow eye-tracking system may allow eye-tracking module 118 to determine the reference eye position with greater accuracy than the eye's position determined from data captured by the fast eye-tracking system. In various embodiments, the slow eye-tracking system may provide eye-tracking data to eye-tracking module 118 at a lower frequency than the fast eye-tracking system. For example, the slow eye-tracking system may operate less frequently or have a slower response time to conserve power.

Eye-tracking unit 130 may be configured to estimate the orientation of the user's eye. The orientation of the eye may correspond to the direction of the user's gaze within near-eye display 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately −1° to 8° laterally and about ±4° vertically. Because the foveal axis is defined according to the fovea, which is located in the back of the eye, the foveal axis may be difficult or impossible to measure directly in some eye tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking unit 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking unit may also be detected. Translation of this type may occur, for example, due to a shift in the position of near-eye display 120 on a user's head. Eye-tracking unit 130 may also detect the torsion of the eye and the rotation of the eye about the pupillary axis. Eye-tracking unit 130 may use the detected torsion of the eye to estimate the orientation of the foveal axis from the pupillary axis. Eye-tracking unit 130 may also track a change in the shape of the eye, which may be approximated as a skew or scaling linear transform or a twisting distortion (e.g., due to torsional deformation). Eye-tracking unit 130 may estimate the foveal axis based on some combinations of the angular orientation of the pupillary axis, the translation of the eye, the torsion of the eye, and the current shape of the eye.

In some embodiments, eye-tracking unit 130 may include multiple emitters or at least one emitter that can project a structured light pattern on all portions or a portion of the eye. The structured light pattern may be distorted due to the shape of the eye when viewed from an offset angle. Eye-tracking unit 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking unit 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking unit 130 can also estimate the pupillary axis, the translation of the eye, the torsion of the eye, and the current shape of the eye based on the image of the distorted structured light pattern captured by the camera.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect (or the nearest point between the two axes). The direction of the user's gaze may be the direction of a line passing through the point of convergence and the mid-point between the pupils of the user's eyes. Eye-tracking unit 130 is further described below with respect to, for example, FIGS. 3-14.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, a virtual reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or some combination thereof, to predict a future location of near-eye display 120. Headset tracking module 114 may provide the estimated or predicted future position of near-eye display 120 to VR engine 116.

Headset tracking module 114 may calibrate the artificial reality system environment 100 using one or more calibration parameters, and may adjust one or more calibration parameters to reduce errors in determining the position of near-eye display 120. For example, headset tracking module 114 may adjust the focus of external imaging device 150 to obtain a more accurate position for observed locators on near-eye display 120. Moreover, calibration performed by headset tracking module 114 may also account for information received from IMU 132. Additionally, if tracking of near-eye display 120 is lost (e.g., external imaging device 150 loses line of sight of at least a threshold number of locators 126), headset tracking module 114 may re-calibrate some or all of the calibration parameters.

VR engine 116 may execute applications within artificial reality system environment 100 and receive position information of near-eye display 120, acceleration information of near-eye display 120, velocity information of near-eye display 120, predicted future positions of near-eye display 120, or some combination thereof from headset tracking module 114. VR engine 116 may also receive estimated eye position and orientation information from eye-tracking module 118. Based on the received information, VR engine 116 may determine content to provide to near-eye display 120 for presentation to the user. For example, if the received information indicates that the user has looked to the left, VR engine 116 may generate content for near-eye display 120 that mirrors the user's eye movement in a virtual environment. Additionally, VR engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking unit 130 may output eye-tracking data including images of the eye, and eye-tracking module 118 may determine the eye's position based on the images. For example, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, as described above, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display 120 may reach the eye (as in some augmented reality applications), the calibration parameters may include correction factors for intensity and color balance due to variations in light from the outside of near-eye display 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display 120 experiencing greater than a threshold change in illumination due to external light.

Figure 2:
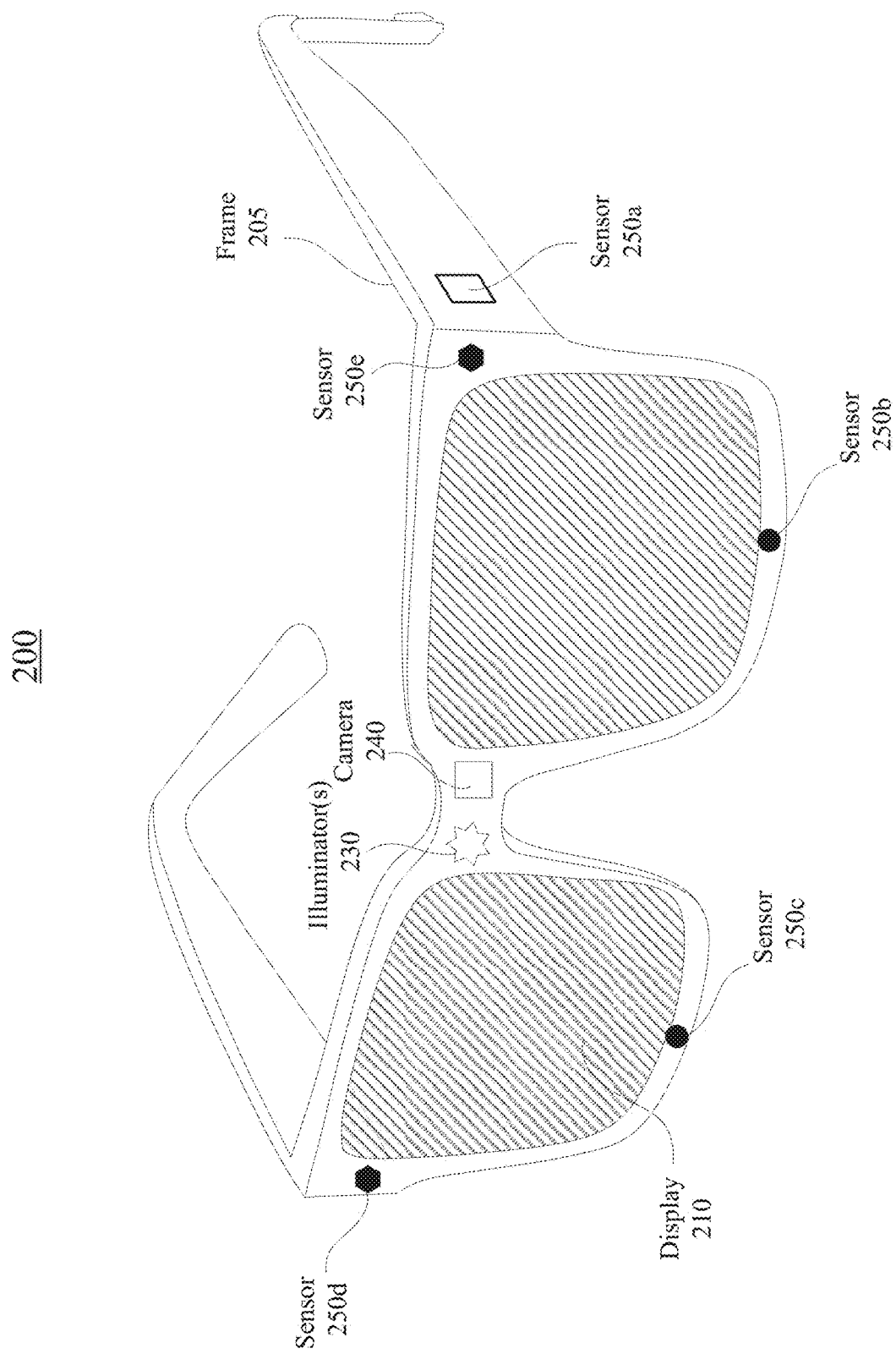
FIG. 2 is a perspective view of a simplified example near-eye display including various sensors.

FIG. 2 is a perspective view of a simplified example near-eye display 200 including various sensors. Near-eye display 200 may be a specific implementation of near-eye display 120 of FIG. 1, and may be configured to operate as a virtual reality display, an augmented reality display, and/or a mixed reality display. Near-eye display 200 may include a frame 205 and a display 210. Display 210 may be configured to present content to a user. In some embodiments, display 210 may include display electronics and/or display optics. For example, as described above with respect to near-eye display 120 of FIG. 1, display 210 may include an LCD display panel, an LED display panel, or an optical display panel (e.g., a waveguide display assembly).

Near-eye display 200 may further include various sensors 250a, 250b, 250c, 250d, and 250e on or within frame 205. In some embodiments, sensors 250a-250e may include one or more depth sensors, motion sensors, position sensors, inertial sensors, or ambient light sensors. In some embodiments, sensors 250a-250e may include one or more image sensors configured to generate image data representing different fields of views in different directions. In some embodiments, sensors 250a-250e may be used as input devices to control or influence the displayed content of near-eye display 200, and/or to provide an interactive VR/AR/MR experience to a user of near-eye display 200. In some embodiments, sensors 250a-250e may also be used for stereoscopic imaging.

In some embodiments, near-eye display 200 may further include one or more illuminators 230 to project light into the physical environment. The projected light may be associated with different frequency bands (e.g., visible light, infra-red light, ultra-violet light, etc.), and may serve various purposes. For example, illuminator(s) 230 may project light in a dark environment (or in an environment with low intensity of infra-red light, ultra-violet light, etc.) to assist sensors 250a-250e in capturing images of different objects within the dark environment. In some embodiments, illuminator(s) 230 may be used to project certain light pattern onto the objects within the environment. In some embodiments, illuminator(s) 230 may be used as locators, such as locators 126 described above with respect to FIG. 1.

In some embodiments, near-eye display 200 may also include a high-resolution camera 240. Camera 240 may capture images of the physical environment in the field of view. The captured images may be processed, for example, by a virtual reality engine (e.g., virtual reality engine 116 of FIG. 1) to add virtual objects to the captured images or modify physical objects in the captured images, and the processed images may be displayed to the user by display 210 for AR or MR applications.

Figure 3:
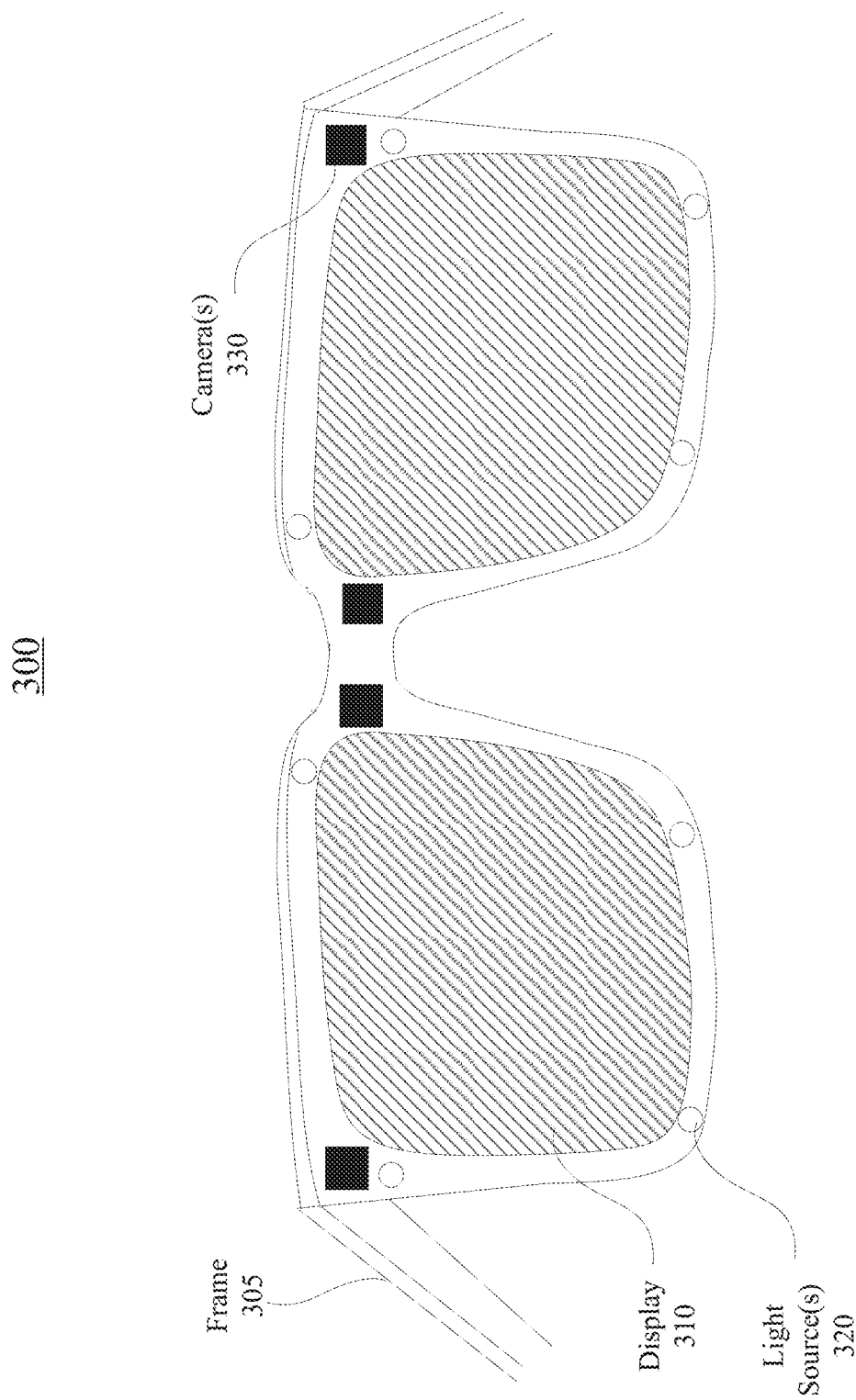
FIG. 3 is a perspective view of a simplified example near-eye display including an example eye-tracking unit.

FIG. 3 is a perspective view of a simplified example near-eye display 300 including an example eye-tracking unit. FIG. 3 may be the perspective view of near-eye display 300 viewed from the side that faces the eyes of the user. As near-eye display 200, near-eye display 300 may include a frame 305 and a display 310. Frame 305 may be coupled to or embedded with one or more electrical or optical components. Display 310 may include display electronics and/or display optics, and may be configured to present content to a user. For example, as described above, display 310 may include an LCD display panel, an LED display panel, and/or an optical display panel (e.g., a waveguide display assembly).

Near-eye display 300 may include one or more light sources 320 and one or more cameras 330. Light source(s) 320 and camera(s) 330 may be coupled to or embedded in frame 305. Light source(s) 320 may emit light in certain frequency range (e.g., NIR) towards the eye of the user. The emitted light may be reflected by the eyes of the user. The reflected light may then be received by camera(s) 330 to form images that may indicate certain characteristics of light source(s) 320 and the eyes of the user. Based on the images captured by camera(s) 330, an eye's position, including the orientation and location of the eye, may be determined. The gaze direction and/or gaze point of the user may also be determined based on the detected eye's position as described above with respect to FIG. 1. The image content displayed on display 310 may then be adjusted accordingly based on the gaze direction and/or gaze point of the user.

Figure 4:
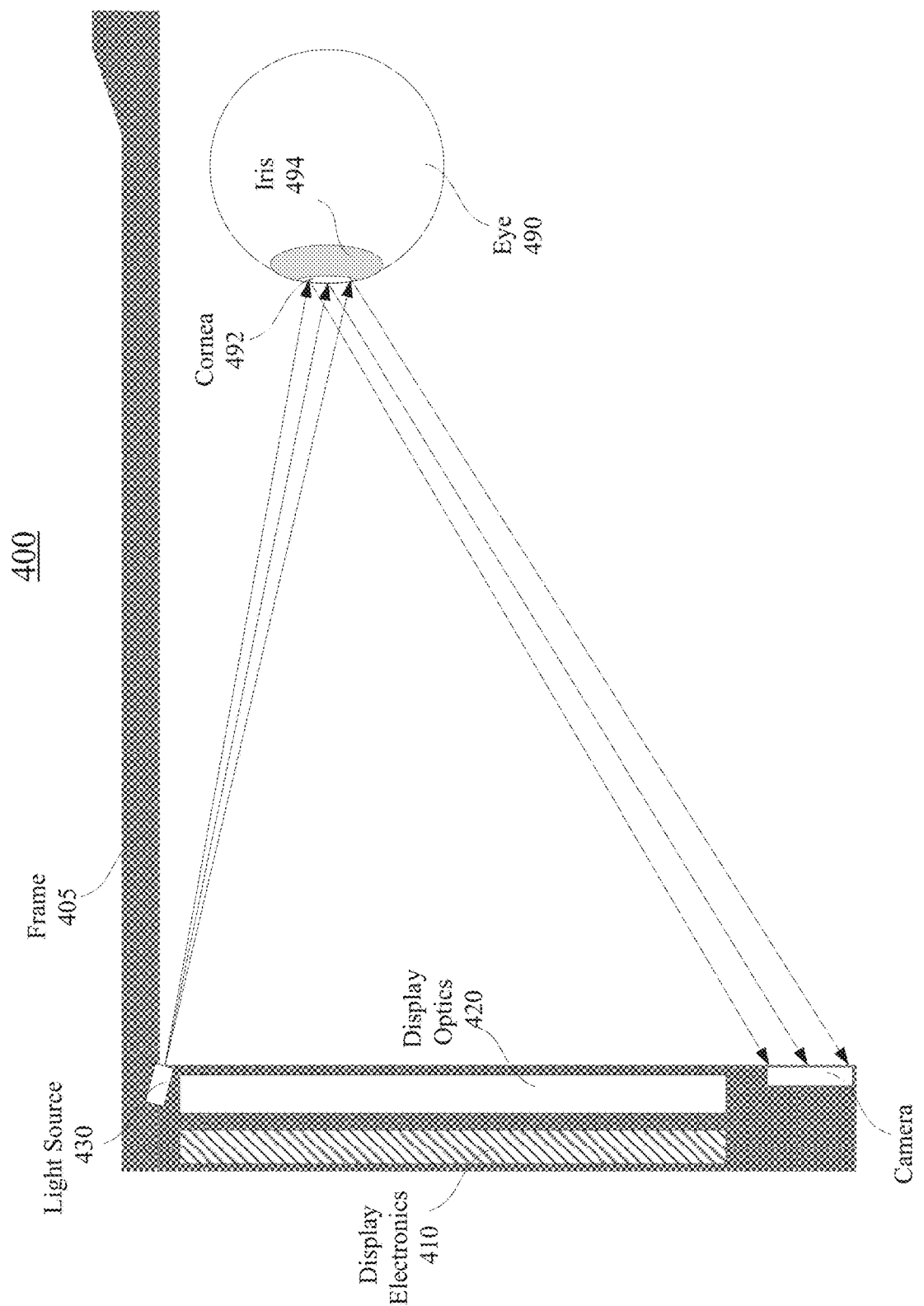
FIG. 4 is a cross-sectional view of an example near-eye display including an example eye-tracking unit.

FIG. 4 is a cross-sectional view of an example near-eye display 400 including an example eye-tracking unit. It is noted that, even though FIG. 4 and other figures in the present disclosure show an eye of a user of a near-eye display for illustration purposes, the eye of the user is not a part of the corresponding near-eye display. As near-eye displays 200 and 300, near-eye display 400 may include a frame 405 and a display system that includes display electronics 410 and/or display optics 420 coupled to or embedded in frame 405. As described above with respect to display electronics 122, display electronics 410 may display images to the user according to data received from a console, such as console 110. Display electronics 410 may include sub-pixels to emit light of a predominant color, such as red, green, blue, white, or yellow. Display optics 420 may display image content optically (e.g., using optical waveguides and optical couplers), or magnify image light emitted by display electronics 410, correct optical errors associated with the image light, and present the corrected image light to the user of near-eye display 400. In various embodiments, display optics 420 may include one or more optical elements. Example optical elements may include a substrate, optical waveguides, optical couplers, an aperture, a Fresnel lens, a convex lens, a concave lens, a filter, or any other suitable optical element that may affect image light emitted from display electronics 410. Display optics 420 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Near-eye display 400 may include an eye-tracking unit that includes a light source 430 and a camera 440. Light source 430 and camera 440 may be coupled to or embedded in frame 405. In various embodiments, light source 430 and camera 440 may be positioned above, below, to the left, or to the right of the user's line of sight to display optics 420 and display electronics 410. For example, one or more of light source 430 and camera 440 may be positioned adjacent to a corner of display optics 420. In some implementations, light source 430 and camera 440 may be positioned closer to the user's eye than display optics 420. For example, one or more of light source 430 and camera 440 may be positioned on the temples of frame 405. Light source 430 may emit light towards an eye 490 of the user of near-eye display 400. The emitted light may be reflected by the cornea of eye 490 of the user. The reflected light may then be received by camera 440 to generate images that may indicate certain characteristics of light source 430 and eye 490 of the user. Based on the images captured by camera 440, the position of eye 490, including the orientation and location of eye 490, may be determined. The gaze direction and/or gaze point of the user may be determined based on the detected position of eye 490 as described above with respect to FIG. 1. The image content displayed on the display system may then be adjusted accordingly based on the gaze direction and/or gaze point of the user.

In some implementations, light source 430 may include a coherent light source, such as a laser. The laser may illuminate a portion of the surface of eye 490, such as cornea 492 or iris 494, with coherent light. For example, the laser may emit light in the infrared spectrum having a wavelength between about 830 nm and about 860 nm. As another example, the laser may emit light having a wavelength between about 900 nm and about 1160 nm, such as between about 930 nm and about 980 nm. Alternatively, the laser may emit light having a wavelength in the visible spectrum. However, illuminating the eye with light in the infrared spectrum may reduce interference and noise from visible light emitted by display electronics 410 or from external visible light that passes into near-eye display 400, as in some augmented reality applications. The laser may have a low power to prevent user discomfort or injury. For example, the laser may be a Class 1 laser with a power of about 0.3 microwatts or less. As another example, the laser may be an edge emitting semiconductor laser or a vertical-cavity surface-emitting laser (VCSEL).

Although light source 430 may typically include a coherent light source (i.e., a light source emitting light at a precise wavelength with negligible phase difference), non-coherent light sources may be used in some implementations. For example, in some implementations, light source 430 may include an LED emitting light with wavelengths in the visible band or in the infrared band. However, because LEDs emit light across a broader wavelength range than a laser, LEDs may produce images with lower contrast than those produced using a coherent light source. In some embodiments, an additional laser (or other light source) that emits light at a different wavelength than the laser (or other light source) may be used to increase eye-tracking precision.

Camera 440 may capture light reflected by the portion of the eye surface illuminated by the laser or other light source. In one example, camera 440 may capture an image with a pixel array of 30 by 30 pixels, where a pixel may correspond to a resolution of about 15 to 40 micrometers of the eye surface. In this example, the imaged portion of the surface of eye 490 may have an area of between about 0.20 and about 1.44 square millimeters. In various embodiments, camera 440 may have increased resolution to increase eye tracking precision and accuracy. For example, camera 440 may have a quarter video graphic array (QVGA) resolution with a pixel array of 320×240 pixels. Increasing the number of pixels included in camera 440 may allow the size of the surface of eye 490 corresponding to a pixel to be decreased, allow the area of the surface of eye 490 imaged by camera 440 to be increased, or both. However, using fewer pixels may beneficially reduce the power consumption of camera 440, and illuminating and imaging a smaller area of the surface of the eye may beneficially reduce power consumption by the laser. In some embodiments, camera 440 may include an optical mouse sensor or other sensor capturing images at a very high frame rate. For example, in some cases, camera 440 may capture about 5,000 images per second to provide precise eye tracking data.

Figure 5:
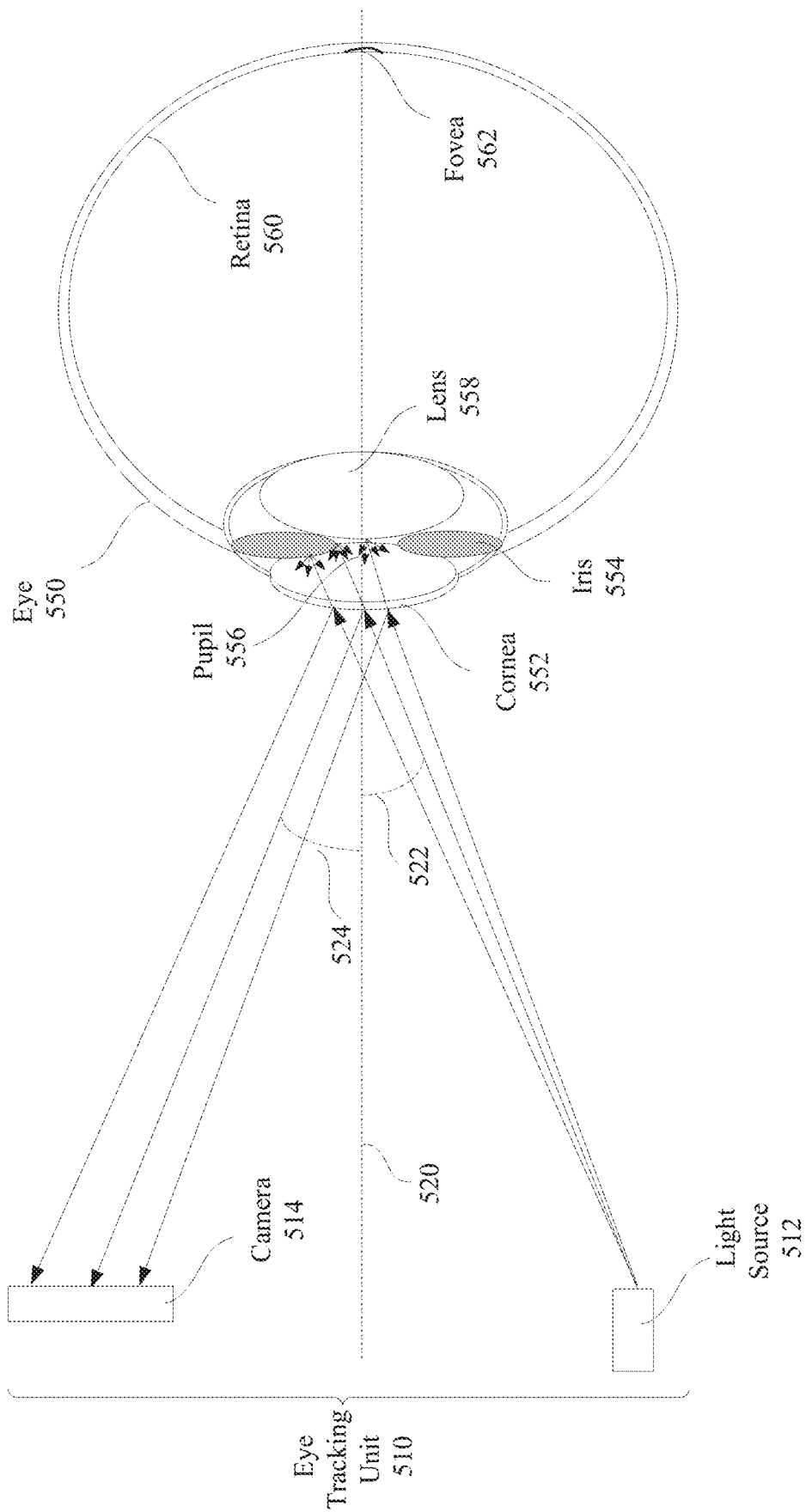
FIG. 5 illustrates light reflections and diffusions by an eye during eye tracking.

FIG. 5 illustrates light reflections and diffusions by an eye 550 during eye tracking using an eye-tracking unit 510. Eye-tracking unit 510 may include a light source 512 and a camera 514 as described above with respect to FIG. 4. In other embodiments, eye-tracking unit 510 may include different and/or additional components than those depicted in FIG. 5. Light source 512 may include a laser and may be mounted at a laser angle 522 relative to a surface normal vector 520 of eye 550. Surface normal vector 520 is orthogonal to a portion of the surface (e.g., cornea 552) of eye 550 illuminated by light source 512. In the example shown in FIG. 5, surface normal vector 520 may be the same as the foveal axis (a line from the center of pupil 556 to fovea 562) of eye 550. Laser angle 522 may be measured between surface normal vector 520 and a line from a center of the portion of the surface of eye 550 illuminated by light source 512 to a center of the output aperture of light source 512. Camera 514 may be mounted at a camera angle 524 relative to surface normal vector 520 of eye 550. Camera angle 524 may be measured between surface normal vector 520 and a line from a center of the portion of the surface of eye 550 illuminated by light source 512 to a center of the image sensor or light input aperture of camera 514. In some embodiments, a difference between laser angle 522 and camera angle 524 is less than a threshold amount so that camera 514 may capture images via specular reflections of light incident on cornea 552 of eye 550, which may beneficially increase contrast of the resulting image and minimize light power loss and power consumption.

The light emitted by light source 512 may substantially uniformly illuminate a portion of the eye surface (e.g., cornea 552). A portion of the emitted light may be reflected specularly by cornea 552 of eye 550 and captured by camera 514. In some cases, the light incident on eye 550 may propagate into the eye for a small distance before being reflected. At least some portions of the light may enter eye 550 through cornea 552 and reach iris 554, pupil 556, lens 558, or retina 560 of eye 550. Because the eye surface and the interfaces within eye 550 (e.g., surface of iris 554 or pupil 556) may be rough (e.g., due to features such as capillaries or bumps), the eye surface and the interfaces within eye 550 may scatter the incident light in multiple directions. Different portions of the eye surface and the interfaces within eye 550 may have different arrangements of features. Thus, an intensity pattern of the light reflected by eye 550 may depend on the arrangement of features within the illuminated portion of eye 550, which may allow identification of the portion of the eye from the intensity pattern.

Camera 514 may collect and project light reflected by the illuminated portion of eye 550 onto an image sensor of camera 514. Camera 514 may also correct one or more optical errors (such as those described with respect to the display optics 124) to improve the contrast and other properties of the images captured by the image sensor of camera 514. In some embodiments, camera 514 may also magnify the reflected light. In some embodiments, camera 514 may enlarge the images. The image sensor of camera 514 may capture incident light focused by a lens assembly of camera 514. Thus, camera 514 may effectively capture an image of light source 512 (the emitted light of which is reflected specularly by the cornea of the eye) reflected by the eye, resulting in a "glint" in the captured image. Because of the scattering (diffusive reflections) at the eye surface and internal interfaces of the eye, light incident on a point of the image sensor may include light reflected from multiple points within the illuminated portion of eye 550, and thus may be the result of the interference of the light reflected from the multiple points. Thus, the image sensor of camera 514 may also capture a diffraction or speckle pattern formed by a combination of light reflected from multiple points of the surface of eye 550.

Each pixel of the image sensor may include a light-sensitive circuit that can output a current or voltage signal proportional to the intensity of the light incident on the pixel. In some embodiments, the pixels of the image sensor may be sensitive to light in a narrow wavelength band. In some other embodiments, the pixels of the image sensor may have a wide-band or multi-band sensitivity. For example, the image sensor of camera 514 may include a complementary metal-oxide semiconductor (CMOS) pixel array, which may be used with laser light having a wavelength less than about 850 nm. As another example, the image sensor of camera 514 may include an indium gallium arsenide (InGaAs) alloy pixel array. Such an image sensor may be used with a laser emitting laser light having a wavelength between about 900 nm and about 1160 nm.

In some embodiments, to determine a position change of eye 550, an eye-tracking module (e.g., eye-tracking module 118 of FIG. 1) may determine a pixel shift between images. Multiplying the pixel shift by a calibrated distance per pixel may allow the eye-tracking module to determine a distance the surface (e.g., cornea 552) of eye 550 has shifted. For example, if the glint captured in one image is shifted by two pixels relative to the glint captured in a previous image, and each pixel corresponds to a distance of 10 micrometers at the surface of eye 550, the surface of eye 550 may have moved about 20 micrometers.

Alternatively or additionally, the eye-tracking module may determine the position of the eye in a captured image by comparing the captured images with one or more previous images having known positions of the eye. For example, the eye-tracking module may include a database of images that are each associated with a reference eye position. By matching the captured image with a stored image, the eye-tracking module may determine that the eye is at the reference eye position associated with the stored image. In some embodiments, the eye-tracking module may identify a feature in a portion of a captured image. The feature may include a diffraction or optical flow pattern associated with a particular portion of eye 550. For example, the eye-tracking module may determine the eye position by retrieving a reference eye position associated with the feature (which was also captured in a reference image), determining a pixel shift between the feature in the captured image and the feature in the reference image, and determining the eye position by modifying the reference eye position according to the determined pixel shift using the calibrated distance per pixel as described above.

As discussed above, camera 514 may effectively capture an image of light source 512 reflected by cornea 552 of eye 550. In many cases, the light source may be an extended source rather than a point source. Thus, the captured image (i.e., glint) of light source 512 may have a shape of a circle, a rectangle, an oval, or an irregular shape, and the spatial structure of light source 512 may be captured in the image. The extended shape of the glint and/or the spatial structure captured in the image of the light source may cause errors when determining the relative location of the glint in the image using, for example, the centroiding algorithm. The errors may affect the accuracy of eye tracking when the relative location (e.g., pixel shift) of the glint in the image is used to determine the corneal location in 3D space.

In addition, the peripheral location of light source 512 may negatively impact the accuracy of the eye tracking due to, for example, the angle of the illuminating light from the light source to the eye and the angle of the reflected light with respect to the camera. For example, when the gaze angle of the eye changes, the reflected light may not be directed to the camera or may be directed to the camera at an extreme angle, which may reduce the accuracy of the eye tracking. In some cases, the light may be obstructed by facial features such as eye lids, eye lashes, etc., and thus may not be able to reach some portions or the whole area of the cornea (or iris) or the camera. Thus, in many implementations, multiple light sources and/or cameras in the periphery of the user's field of view may be used as shown in FIG. 3 in order to improve the accuracy of the eye tracking. For example, a ring of light sources may be placed around the circumference of display electronics and display optics. These light sources may illuminate the eye approximately uniformly and allow for segmentation of the pupil and the iris of the eye. In general, the greater the number of light sources, the better the accuracy of eye-tracking (approximately proportional to the square root of the number of light sources). However, it is not practical to use a large number of light sources because they may consume too much power and/or increase the bill of materials.

According to certain aspects of the present disclosure, a plurality of reflectors (e.g., dichroic mirrors such as hot mirrors) immersed in a transparent substrate that can be positioned in front of the user and within the user's field of view may be used for illumination and imaging in eye tracking. Each reflector may reflect light in a first band of the optical spectrum (e.g., IR light or NIR light) and refract (transmit) light in a second band of the optical spectrum (e.g., visible light). The reflectors may be have a flat, spherical, aspherical, anamorphic, or cylindrical surface. The reflectors may have a reflectivity of at least 30%, at least 50%, and at least 70%, or more, in the desired band of the optical spectrum. The (photopically weighted) transmissivity of the reflector in the working wavelength range (e.g., visible light) may be at least 80%, at least 90%, at least 95%, at least 99%, or higher. Suitable reflectors may include multilayer dielectric reflectors, metallic coatings, and transparent conductive films. The substrate may be transparent to both light in the first band and light in the second band.

In some implementations, the reflectors may be hot mirrors that can reflect IR light but are transparent to visible light. The IR light reflectivity of and visible light transmissivity of the reflectors may vary in a same near-eye display device or in different near-eye display devices. Because visible light is allowed to pass through the reflectors and the substrate, the reflectors can be positioned in front of the user's eyes without obstructing the user's field of view. For example, in an AR application, the user can look through the substrate and the immersed reflectors to see the outside world. In a VR application, the user can look through the substrate and the immersed reflectors to view the displayed content. At the same time, light from a light source for eye illumination may be reflected by the reflectors and reach the user's eye (e.g., cornea), and may then be reflected by the eye to a camera to form the glints in images captured by the camera for eye tracking.

Figure 6:
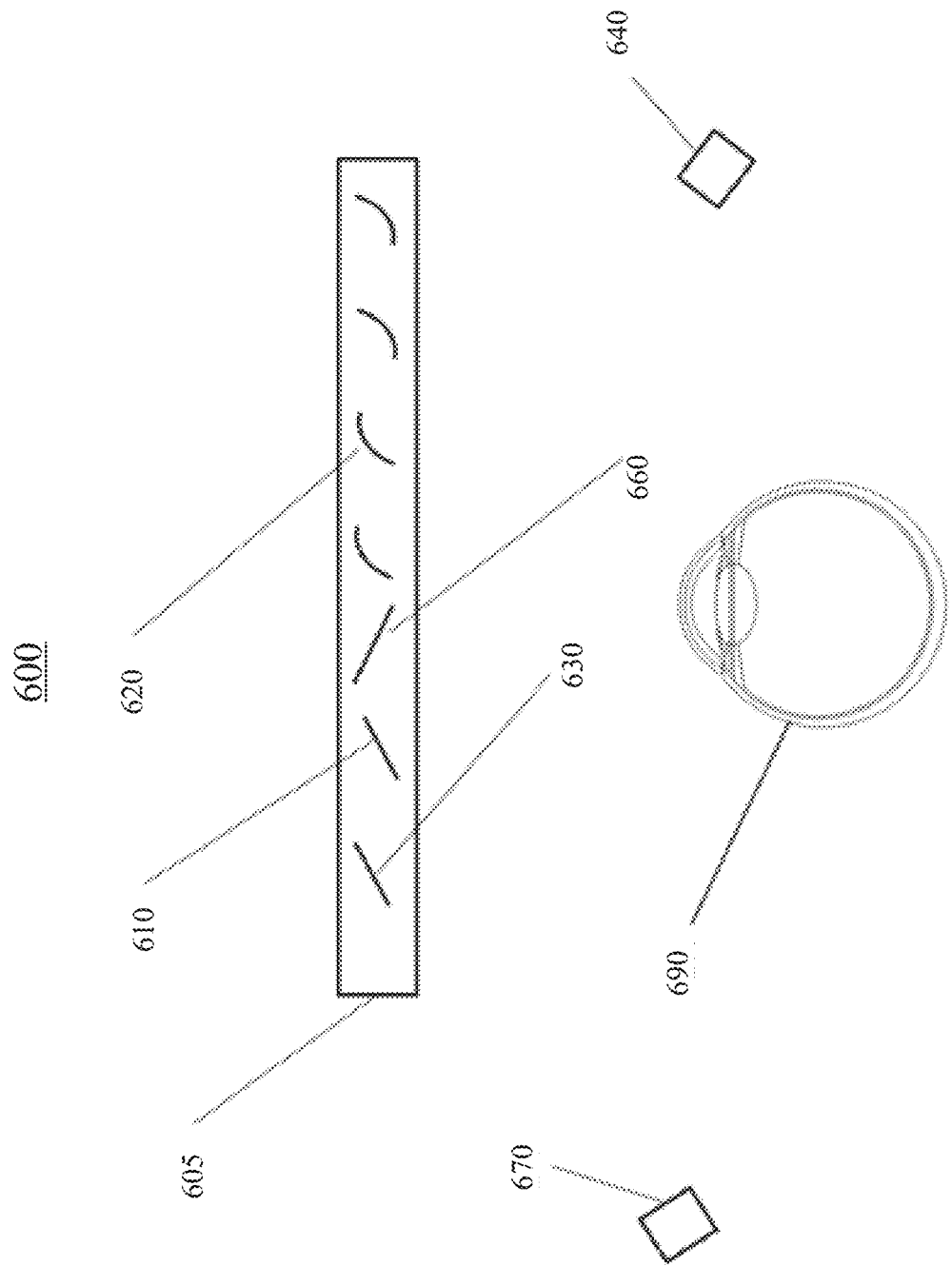
FIG. 6 is a simplified diagram illustrating an example eye-tracking unit in an example near-eye display, according to certain embodiments.

FIG. 6 is a simplified diagram illustrating an example eye-tracking unit 600 in an example near-eye display, according to certain embodiments. Eye-tracking unit 600 may include a light source 640, a camera 670, and a plurality of hot mirrors or facets immersed or embedded in a substrate 605. Substrate 605 may be positioned in front of (e.g., at a distance of about 10-20 mm from) the user's eye 690 and within the field of view of user's eye 690. Substrate 605 may include one or more types of dielectric materials, such as glass, quartz, plastic, polymer, PMMA, crystal, or ceramic, and may be transparent to, for example, both visible light and NIR light. Substrate 605 may have a thickness less than about 10 mm, and may be cuboidal or may have a curved surface. In some implementations, substrate 605 may be a part of spectacle glasses of the near-eye display or a part of display optics described above.

As shown in FIG. 6, a plurality of hot mirrors 610 and 620 (or facets) may be immersed or embedded in substrate 605. The surface of each hot mirror may include features such that the hot mirrors may be transparent to visible light and reflect IR light. For example, in some embodiments, a surface 630 of each hot mirror may be coated with multiple thin dielectric layers (i.e., thin films) of different dielectric materials and/or thicknesses. In some embodiments, the surface of each hot mirror may include a diffractive optical element that is transparent to visible light and reflects IR light. For example, the surface of each hot mirror may include one or more Fresnel lenses or a metagrating. In some embodiments, the surface of each hot mirror may include a photonic crystal structure that is transparent to visible light and reflects IR light. In some embodiments, the surface of each hot mirror may be coated with a layer of material that is transparent to visible light and opaque to IR light.

Figure 7:
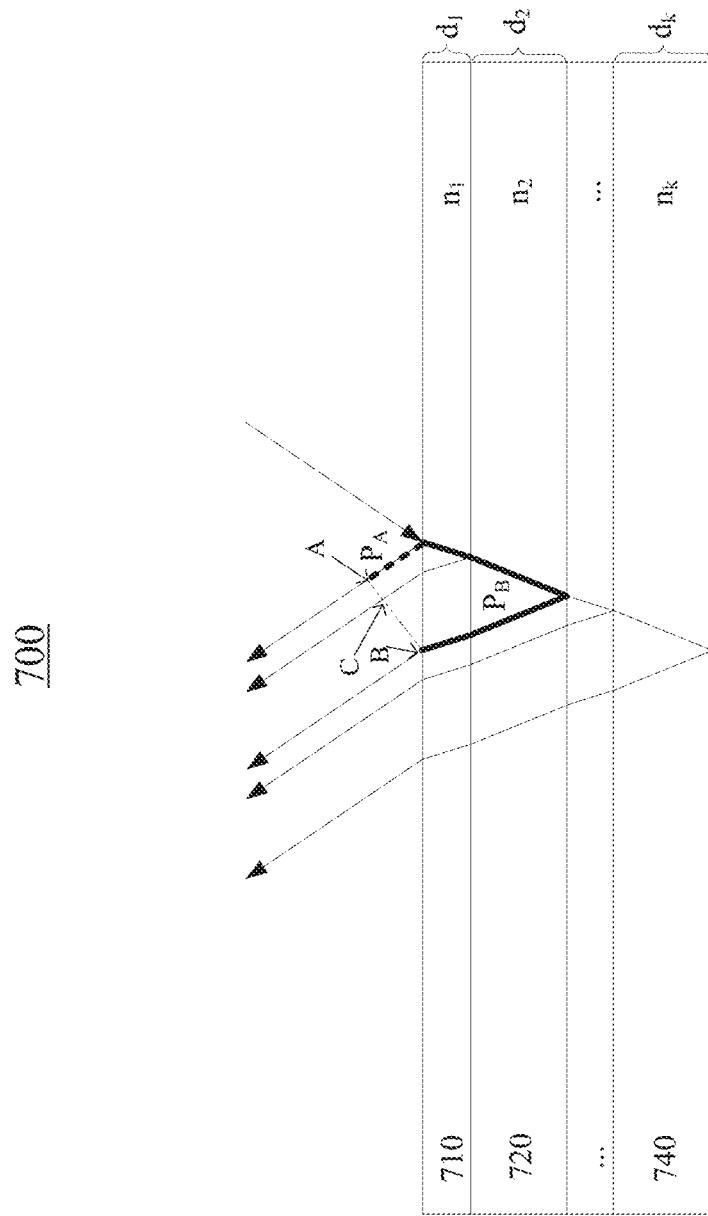
FIG. 7 illustrates a multi-layer dielectric hot mirror, according to certain embodiments.

FIG. 7 illustrates an example hot mirror 700 including multiple dielectric layers, according to certain embodiments. Hot mirror 700 may include K thin dielectric layers 710, 720, ..., and 740. Each of the dielectric layers may include a dielectric material that is transparent to both visible light and NIR light. The refractive indices of the dielectric materials for the K layers may be the same or different at a same optical wavelength. The refractive index of the dielectric material for each layer may be different at different optical wavelengths. The K dielectric layers may have the same or different thicknesses. For example, layer 710 may include a layer of a dielectric material with a refractive index $n_1$ and a thickness $d_1$, layer 720 may include a layer of a dielectric material with a refractive index $n_2$ and a thickness $d_2$, ..., and layer 740 may include a layer of a dielectric material with a refractive index $n_k$ and a thickness $d_k$.

The K thin dielectric layers may form a dielectric mirror (i.e., dichroic mirror) for certain wavelength range. The dielectric mirror may function based on the interference of light reflected at each interface between two dielectric layers in the stack-up. By carefully choosing the number of dielectric layers, the material and/or thickness of each dielectric layer, and the stack-up of the multiple dielectric layers, an optical coating with desired reflectivity at different wavelengths of light may be achieved because of the interference of the light reflected at each interface between two dielectric layers having different refractive indexes due to the discontinuity in refractive index. In the example shown in FIG. 7, the phases of the reflected beams at points A, B, and C shown may be the same, which may lead to constructive interference. For example, the difference in optical path between path $P_A$ and path $P_B$ may be an integer multiple of the desired wavelength $\lambda_0$ to cause the constructive interference. In some implementations, a high reflectivity (e.g., 99.999% or better) over a range of wavelength may be achieved.

In one example, the dielectric mirror may include a Bragg mirror or distributed Bragg reflector, such as the distributed Bragg reflectors used in VCSELs and other types of narrow-linewidth laser diodes (e.g., distributed feedback (DFB) lasers and distributed Bragg reflector (DBR) lasers). A distributed Bragg reflector may function like a one-dimensional photonic crystal and may include a stack of layers with a high refractive index $n_a$ interleaved with layers of a low refractive index $n_b$ at the desired wavelength $\lambda_0$ (or frequency $f_0$) for reflection by the reflector. The thicknesses of the dielectric layers may be chosen such that $$\lambda_0 = 2mn_e\Lambda,$$

where m is an integer number, $n_e$ is the effective refractive index of a layer of material with refractive index $n_a$ and a layer of material with refractive index $n_b$, and $\Lambda$ is the total thickness of a layer of material with refractive index $n_a$ and a layer of material with refractive index $n_b$. The reflectivity R of the reflector at wavelength $\lambda_0$ may be given by:

$$R = \left[\frac{n_0(n_a)^{2N} - n_s(n_a)^{2N}}{n_0(n_a)^{2N} + n_s(n_a)^{2N}}\right]^2,$$

where $n_o$ is the refractive index of the originating medium, $n_s$ is the refractive index of the terminating medium (e.g., substrate), N is the number of repeated pairs of a layer of material with refractive index $n_a$ and a layer of material with refractive index $n_b$. When the reflectors are embedded in a substrate, $n_o$ and $n_s$ may be the refractive index of the substrate. The bandwidth $\Delta f$ of the reflection band of the reflector may be given by:

$$\frac{\Delta f}{f_0} = \frac{4}{\pi}\arcsin\left(\frac{n_b - n_a}{n_b + n_a}\right).$$

Referring back to FIG. 6, light (e.g., IR light) emitted from light source 640 (e.g., an LED, a laser, a lamp, or a similar device) may be used to illuminate the surface of the hot mirrors. The IR light may be reflected from the surfaces of the hot mirrors and may be directed to eye 690. IR light scattered or reflected by eye 690 may then be received by camera 670. In some embodiments, IR light scattered or reflected by eye 690 may be reflected by a hot mirror (e.g., hot mirror 660) to camera 670. Because the hot mirrors are transparent to visible light, eye 690 may be able to see through substrate 605 and hot mirrors 610, 620, and 660.

In various implementations, surface 630 of a hot mirror may have a shape that is flat, concave, convex, cylindrical, spherical, aspherical, anamorphic, freeform, etc. The radius of the curvature of the surface of the hot mirror may control the solid angle of the light reflected to the eye by the hot mirror. In one specific example, the surfaces of some hot mirrors may be concave, and thus the hot mirrors may focus the light from light source 640. This may effectively make the light source appear more like a point source and reduce the size of the resulting glint on the captured image. A smaller glint size in the captured image may lead to a more precise glint location determination and more accurate eye tracking.

Each hot mirror may direct the light from light source 640 to a different direction and illuminate a different area on eye 690, depending on the location, the curvature, the orientation (e.g., tilted angle) of the hot mirror. Thus, the distribution of the light emitted from light source 640 and reflected by the hot mirrors to eye 690 may be controlled by the curvature, size, and orientation of the hot mirrors. Each hot mirror may effectively create a virtual (image of) light source with a virtual origin different from the actual location of light source 640. Thus, the use of the hot mirrors for light reflection may make the virtual light sources appear as if they are placed in front of the eye (as opposed to at the periphery of the field of view of the eye), which may also help to improve the accuracy of eye tracking. Furthermore, using multiple hot mirrors may allow multiple glints to be generated using a single light source, which may improve eye-tracking accuracy without incurring the cost of multiple light sources and the high power consumption by the multiple light sources.

Figure 8:
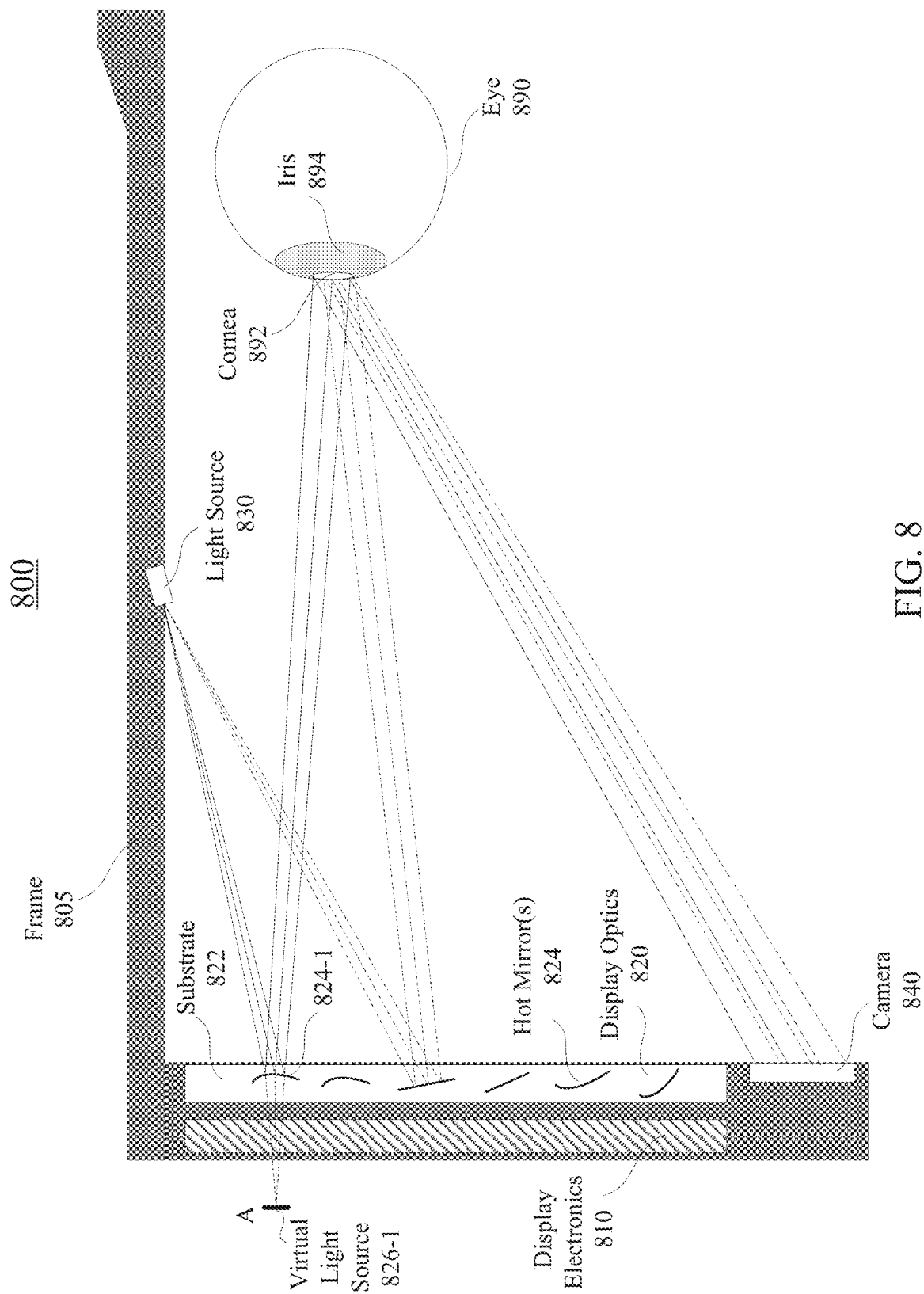
FIG. 8 is a cross-sectional view of an example eye-tracking unit in an example near-eye display, according to certain embodiments.
Figure 9:
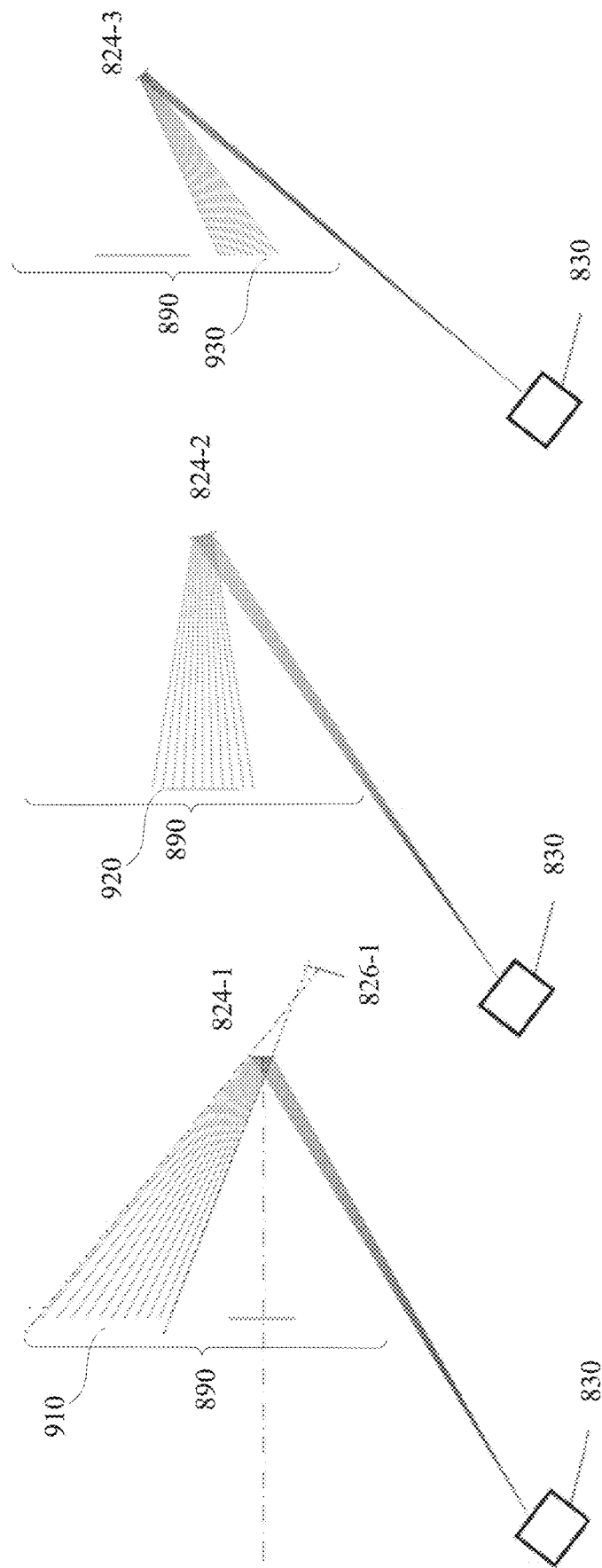
FIG. 9A illustrates the illumination of an eye by a light source using an example immersed hot mirror, according to certain embodiments.
FIG. 9B illustrates the illumination of an eye by a light source using an example immersed hot mirror, according to certain embodiments.
FIG. 9C illustrates the illumination of an eye by a light source using an example immersed hot mirror, according to certain embodiments.

FIG. 8 is a cross-sectional view of an example eye-tracking unit in an example near-eye display 800, according to certain embodiments. As near-eye display 200, 300, or 400, near-eye display 800 may include a frame 805 and a display system that includes display electronics 810 and/or display optics 820 coupled to or embedded in frame 805. Display optics 820 may include a substrate 822 and one or more hot mirrors 824 embedded in substrate 822. The eye-tracking unit may include a light source 830, a camera 840, and the one or more hot mirrors 824 immersed or otherwise embedded in substrate 822. Light source 830 may be similar to any light source described above, and camera 840 may be similar to any camera described above. Light source 830 and camera 840 may be coupled to or embedded in various locations on frame 805. For example, light source 830 may be coupled to or embedded in a temple of frame 805 in the form of eyeglasses.

Light (e.g., IR light, such as NIR light) emitted from light source 830 may illuminate the one or more hot mirrors 824. Hot mirrors 824 may reflect the light and direct the reflected light to an eye 890 of the user of near-eye display 800. As shown in FIG. 8, the one or more hot mirrors 824 may have different locations, sizes, curvatures, and orientations. Thus, each hot mirror may modify the incident light differently. For example, as described above, a hot mirror 824 may have a concave reflecting surface that may focus the incident light, and thus may effectively create a point source in front of eye 890.

FIG. 9A illustrates the illumination of eye 890 by light source 830 using an example immersed hot mirror 824-1, according to certain embodiments. Hot mirror 824-1 may have a convex reflecting surface with a first radius and a first tilted angle. Light source 830 may illuminate hot mirror 824-1. The convex reflecting surface of hot mirror 824-1 may diverge the incident light beam into a light beam with a first solid angle. As a result, a virtual (image of) light source 826-1 created by hot mirror 824-1 may appear to be at location A in front of display electronics 810 and/or display optics 820 as shown in FIG. 8. The light reflected by the convex reflecting surface of hot mirror 824-1 may illuminate area 910 of a cornea 892 and/or an iris 894 of eye 890. Area 910 of cornea 892 and/or iris 894 of eye 890 may in turn reflect the light reflected by hot mirror 824-1 to camera 840 to form a first glint in the captured image.

FIG. 9B illustrates the illumination of eye 890 by light source 830 using an example immersed hot mirror 824-2, according to certain embodiments. Hot mirror 824-2 may have a convex reflecting surface with a second radius larger than the first radius of the curvature of the reflecting surface of hot mirror 824-1, and may have a second tilted angle that is different from the first tilted angle. Light source 830 may illuminate hot mirror 824-2. The convex reflecting surface of hot mirror 824-2 may diverge the incident light beam into a light beam with a second solid angle that is smaller than the first solid angle. As a result, a virtual (image of) light source created by hot mirror 824-2 may appear to be at a location in front of display electronics 810 and/or display optics 820. The light reflected by the convex reflecting surface of hot mirror 824-2 may be directed to an area 920 of cornea 892 and/or iris 894 on eye 890 different from area 910 at least partially due to the difference between the first tilted angle and the second tilted angle. Area 920 of cornea 892 and/or iris 894 may in turn reflect the light reflected by hot mirror 824-2 to camera 840 to form a second glint in the captured image.

FIG. 9C illustrates the illumination of eye 890 by light source 830 using an example immersed hot mirror 824-3, according to certain embodiments. Hot mirror 824-3 may have a convex reflecting surface with a third radius larger than the second radius of the curvature of the reflecting surface of hot mirror 824-2, and may have a third tilted angle that is different from the second tilted angle. Light source 830 may illuminate hot mirror 824-3. The convex reflecting surface of hot mirror 824-3 may diverge the incident light beam into a light beam with a third solid angle that is smaller than the second solid angle. As a result, a virtual (image of) light source created by hot mirror 824-3 may also appear to be at a location in front of display electronics 810 and/or display optics 820. The light reflected by the convex reflecting surface of hot mirror 824-3 may be directed to an area 930 of cornea 892 and/or iris 894 on eye 890 different from area 920 at least partially due to the difference between the third tilted angle and the second tilted angle. Area 930 of cornea 892 and/or iris 894 may in turn reflect the light reflected by hot mirror 824-3 to camera 840 to form a third glint in the captured image.

In various implementations, the location, size, surface curvature, and orientation of each hot mirror 824 may be selected such that: hot mirrors 824 may not block the light to and from each hot mirror (from the light source or to the eye), each area of cornea 892 and/or iris 894 may be illuminated approximately uniformly by hot mirrors 824, little or no light from the light source may pass through the gap between the hot mirrors, each virtual light source may appear to be near the center (rather than the periphery) of the field of view of eye 890 and may illuminate eye 890 at a small incident angle, and the reflected light from eye 890 may reach camera 840 with a small incident angle. As a result, the illumination condition may be optimized for a better eye tracking accuracy. In some embodiments, more than one light source may be used for optimized eye illumination.

Figure 10:
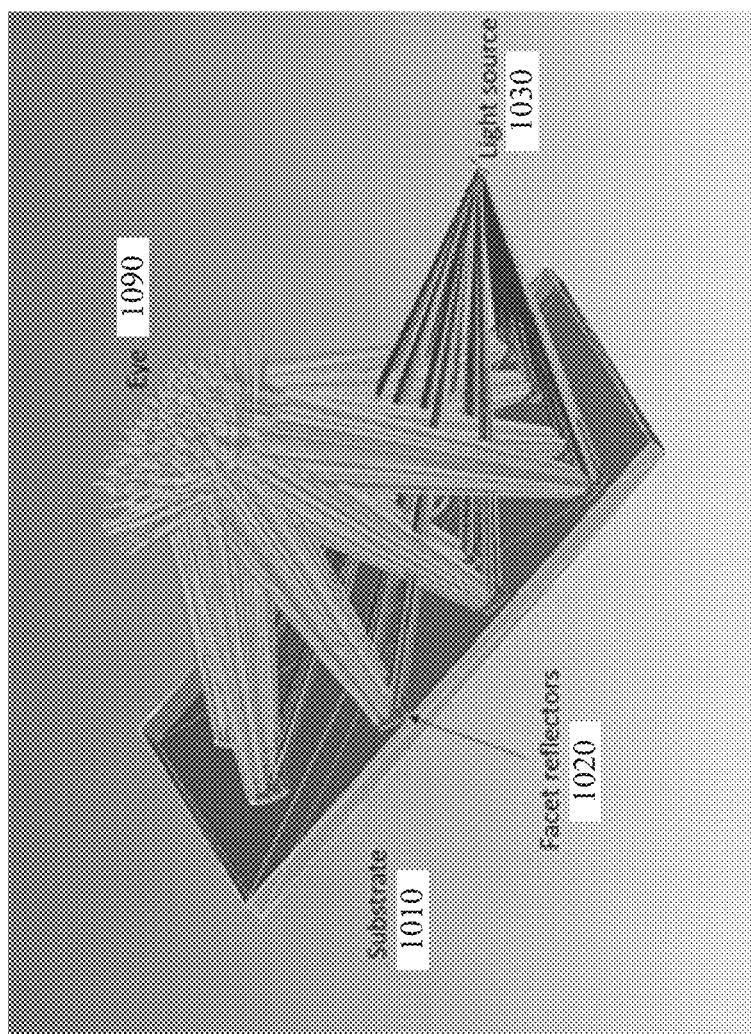
FIG. 10 is a three-dimensional diagram illustrating the illumination of an eye by a light source using a plurality of immersed hot mirrors, according to certain embodiments.

FIG. 10 is a three-dimensional diagram illustrating the illumination of an eye 1090 by a light source 1030 using a plurality of hot mirrors 1020 immersed in a substrate 1010, according to certain embodiments. The plurality of hot mirrors 1020 may be distributed as an array in different areas of substrate 1010, and may have different sizes, surface curvatures, and orientations. In some embodiments, substrate 1010 may be flat. In some embodiments, substrate 1010 may be curved. In some embodiments, the plurality of hot mirrors 1020 may have a same depth within substrate 1010. In some embodiments, the plurality of hot mirrors 1020 may be embedded within substrate 1010 at different depths. Thus, the plurality of hot mirrors 1020 may be arranged as a two-dimensional array or three-dimensional array. The plurality of hot mirrors 1020 may reflect light (e.g., IR light) from light source 1030 to different areas on eye 1090, and may be specularly reflected and diffusively reflected by various portions of eye 1090 as described above.

Figure 11:
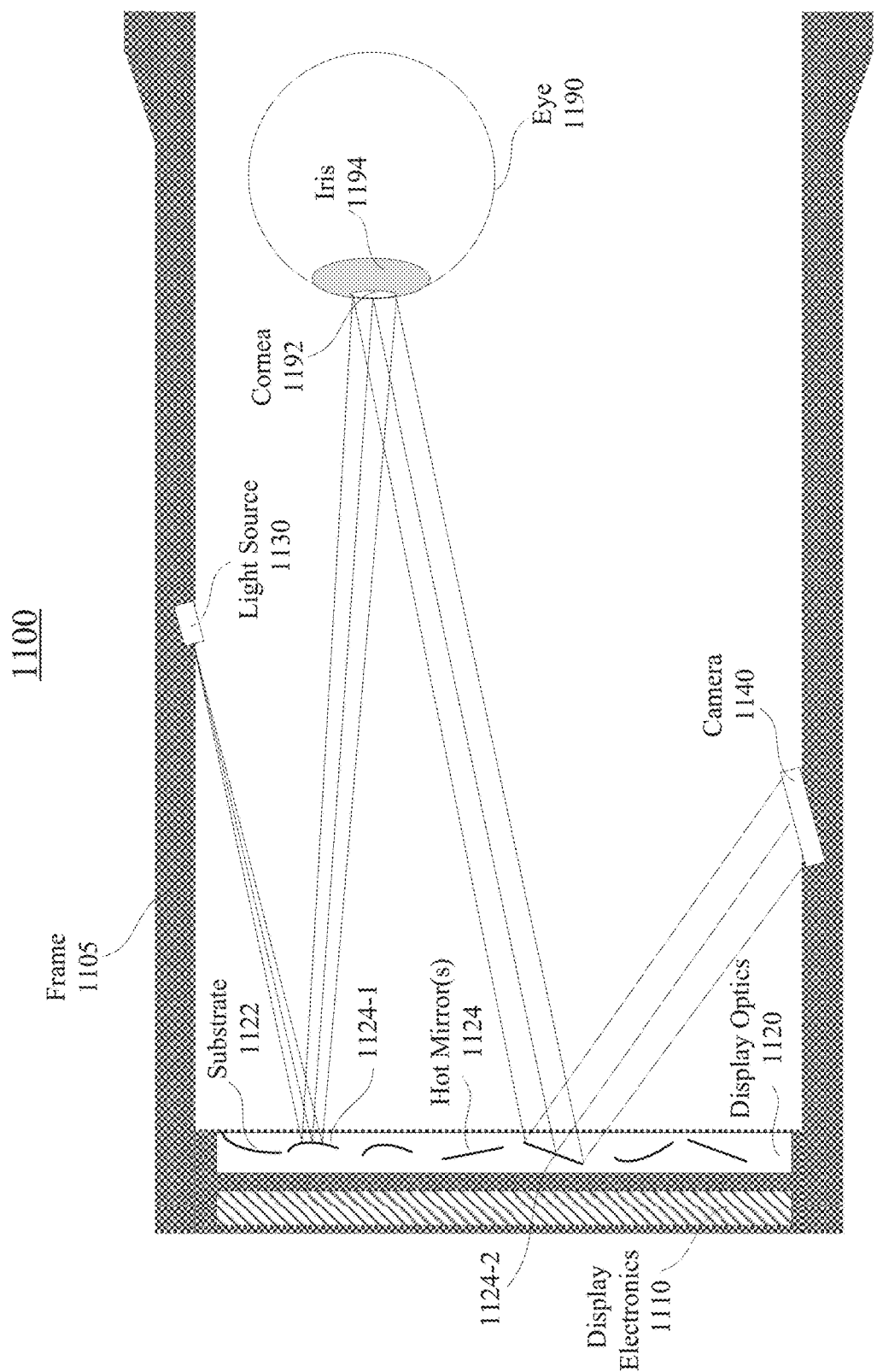
FIG. 11 is a cross-sectional view of an example eye-tracking unit in an example near-eye display, according to certain embodiments.

FIG. 11 is a cross-sectional view of an example eye-tracking unit in an example near-eye display 1100, according to certain embodiments. As near-eye display 800, near-eye display 1100 may include a frame 1105 and a display system that includes display electronics 1110 and/or display optics 1120 coupled to or embedded in frame 1105. Display optics 1120 may include a substrate 1122 and one or more hot mirrors 1124 embedded in substrate 1122. The eye-tracking unit may include a light source 1130, a camera 1140, and the one or more hot mirrors 1124 immersed or otherwise embedded in substrate 1122. Light source 1130 may be similar to any light source described above, and camera 1140 may be similar to any camera described above. Light source 1130 and camera 1140 may be coupled to or embedded in various locations on frame 1105. For example, light source 1130 and/or camera 1140 may be coupled to or embedded in one or both temples of frame 1105 in the form of eyeglasses. Some of the one or more hot mirrors 1124 may be used to reflect light emitted by light source 1130 to a user's eye. Some other hot mirrors may be used to direct light reflected by the use's eye to camera 1140. The hot mirrors used to reflect light emitted by light source 1130 to the user's eye and the hot mirrors used to direct light reflected by the user's eye to camera 1140 may be distributed at desired locations within substrate 1122.

Light (e.g., IR light, such as NIR light) emitted from light source 1130 may illuminate at least some of the one or more hot mirrors 1124. Hot mirrors 1124 illuminated by light source 1130 may reflect the incident light to an eye 1190 of the user of near-eye display 1100. As shown in FIG. 11, the one or more hot mirrors 1124 may have different locations, sizes, curvatures, and orientations. Thus, each hot mirror may modify the incident light differently. For example, as described above, a hot mirror 1124 may have a concave reflecting surface that may focus the incident light, and thus may effectively create a point source in front of eye 1190. In another example, light source 1130 may illuminate a hot mirror 1124-1. The convex reflecting surface of hot mirror 1124-1 may diverge the incident light beam. As a result, a virtual light source created by hot mirror 1124-1 may appear to be a point source at a location in front of display electronics 1110 and/or display optics 1120. The light reflected by the convex reflecting surface of hot mirror 1124-1 may illuminate an area of a cornea 1192 and/or an iris 1194 of eye 1190. Cornea 1192 and/or iris 1194 of eye 1190 may in turn specularly and/or diffusively reflect the light reflected by hot mirror 1124-1 to hot mirror 1124-2. Hot mirror 1124-2 may then reflect the light reflected by eye 1190 to camera 1140 to form a glint in an image captured by camera 1140.

It is noted that although only one light source and one camera are shown in the FIGS. 6 and 8-11, more than one light source and/or more than one camera may be used in an eye-tracking unit and more than one eye-tracking unit may be used in a near-eye display.

In some implementations, dichromatic beam splitters (i.e., dichroic mirrors) other than hot mirrors may be used to allow visible light to pass through while reflecting light used for eye tracking. In some implementations, polarized light beams may be used for eye tracking, and transparent polarization beam splitters may be used to selectively direct the polarized light beams for eye tracking to the eye or the camera, while allowing light with different polarizations to pass through transparently.

Various fabrication techniques may be used to form immersed hot mirrors or other dichroic mirrors in a transparent substrate. For example, the hot mirrors immersed in the substrate may be formed additively or subtractively. In some cases, features with desired sizes, curvatures, orientations at desired locations may be formed on a base substrate by selectively depositing layers of transparent materials having different patterns on the base substrate. In some cases, a substrate with a surface having features with desired sizes, curvatures, and orientations at desired locations may be formed by a molding process. In some cases, a base substrate may be etched using semiconductor processes or otherwise micro-machined to form features with desired sizes, curvatures, and orientations at desired locations. The formed substrate having the desired features may then be coated with one or more coating layers with desired thicknesses and materials. The coating layer(s) at locations without the desired features may be etched away before a top layer of substrate is formed on the base substrate to cover the surface of the base substrate having the desired features and coating layer(s).

Figure 12:
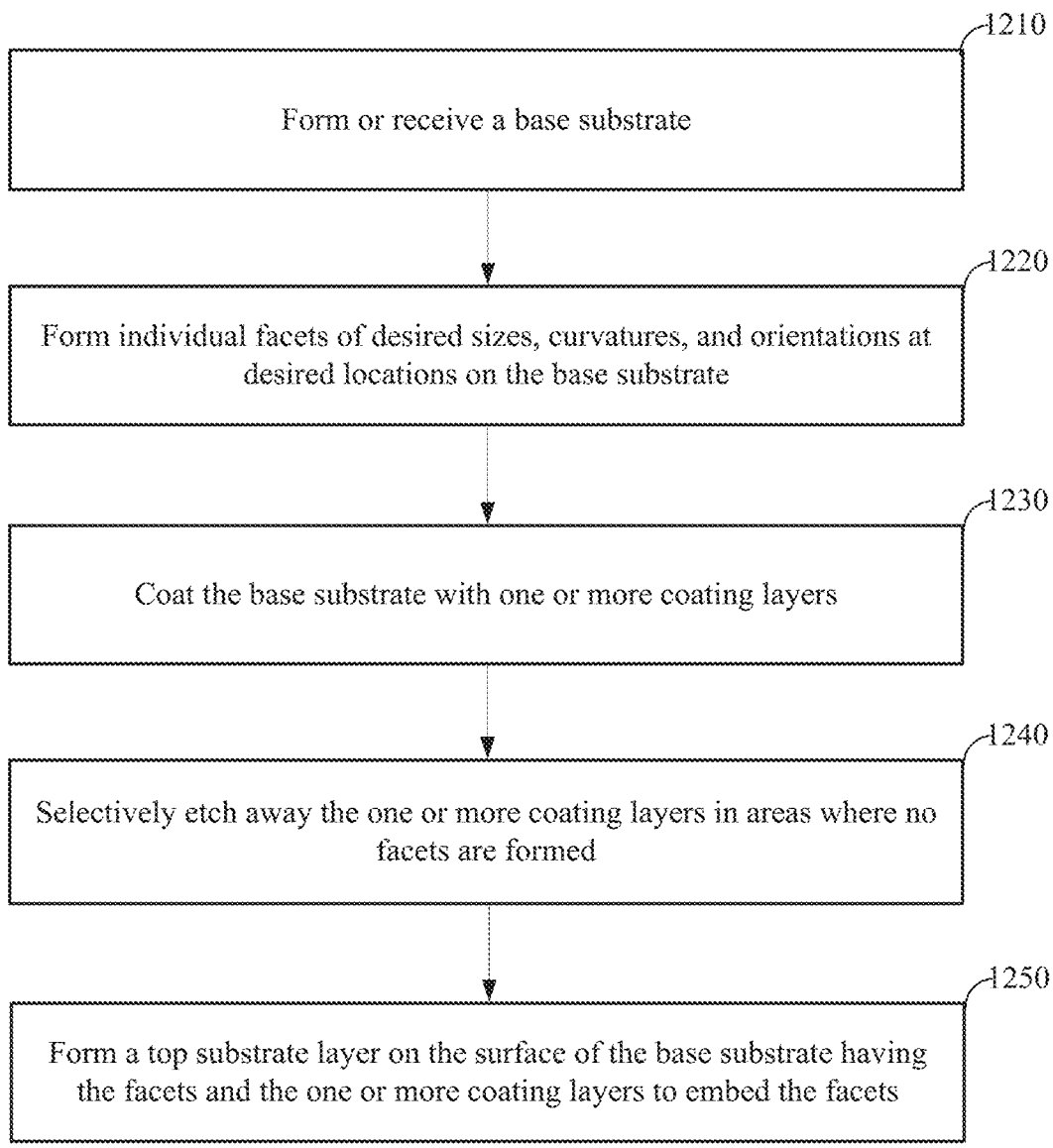
FIG. 12 is a simplified flow chart illustrating an example method for manufacturing hot mirrors immersed in a substrate, according to certain embodiments.

FIG. 12 is a simplified flow chart 1200 illustrating a method for manufacturing hot mirrors immersed in a substrate, according to certain embodiments. At block 1210, a base substrate may be formed or provided. The base substrate may be transparent to both visible light and light used for eye tracking (e.g., NIR light). The base substrate may be flat or may have a desired curvature. The base substrate may include one or more types of dielectric materials, such as glass, quartz, plastic, polymer, PMMA, crystal, or ceramic. The base substrate may have a uniform thickness or different thicknesses at different locations.

At block 1220, individual facets of desired sizes, curvatures, and orientations may be formed at desired locations on the base substrate. For example, the base substrate may be processed by diamond turning to form features having facets with the desired sizes, curvatures, and orientations. The base substrate may also be processed using semiconductor processes or other micromachining techniques to form features having facets with the desired sizes, curvatures, and orientations.

At block 1230, the surface of the base substrate having the individual facets may be coated with one or more coating layers, for example, in a vacuumed chamber. As described above, in some embodiments, the one or more coating layers may include multiple thin dielectric layers designed to reflect IR light and refract visible light. In some cases, a layer of a material that is transparent to visible light, but may have a high refractive index (and thus a high reflectivity at the surface interfacing with the substrate) may be coated on the surface of the base substrate having the individual facets. In some embodiments, the entire surface of the base substrate having the individual facets may be coated with the one or more coating layers. In some embodiments, the surface of the base substrate having the individual facets may be selectively coated with the one or more coating layers, for example, using a mask that has openings only at the locations where the facets are located.

Optional, at block 1240, if the entire surface of the base substrate is coated, the one or more coating layers on the surface of the base substrate may be selectively etched away to expose the surface of the substrate in areas where no facets are formed, while the coating layer(s) on the surfaces of the facets may be kept.

At block 1250, a top substrate layer may be formed on the surface of the base substrate having the facets and the one or more coating layers to embed the facets between the base substrate and the top substrate layer. In some implementations, the top substrate layer may include a material same as the material of the base substrate. In some implementations, the top substrate layer may include a material that is different from the material of the base substrate, but may have a refractive index similar to the refractive index of the material of the base substrate. In some implementations, the material of the top substrate layer may have a refractive index different from the refractive index of the material of the base substrate. In one example, the top substrate layer may include methyl methacrylate. In some embodiments, the top substrate layer may be cast on the base substrate and cured by, for example, UV light or heat.

Figure 13:
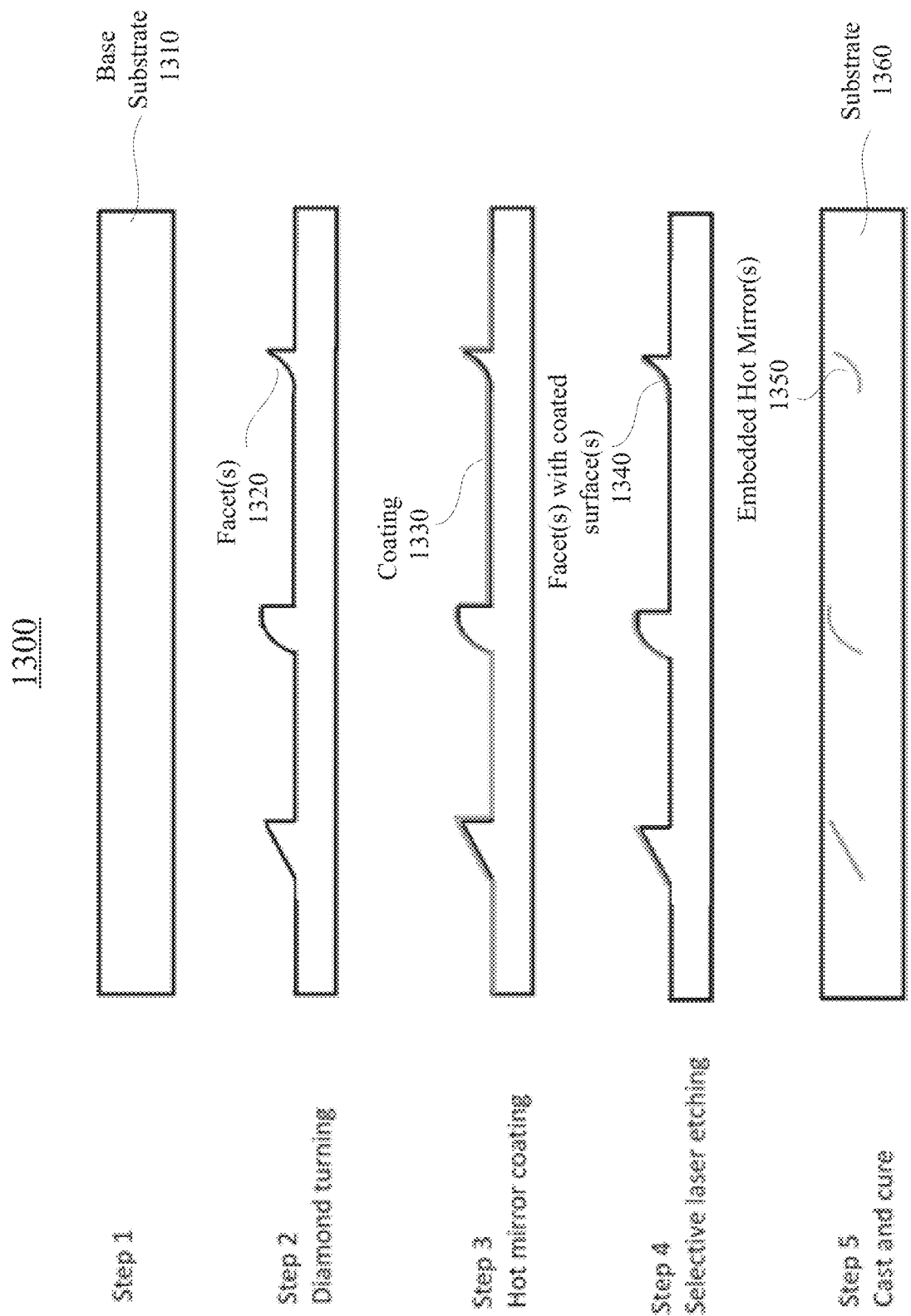
FIG. 13 illustrates example products after each manufacturing step using the example method described in FIG. 12.

FIG. 13 illustrates example products after each manufacturing step using the example method described above with respect to FIG. 12. After step 1 (operations at block 1210), a base substrate 1310 may be formed or provided. After step 2 (operations at block 1220), some portions of the base substrate may be removed, for example, by diamond turning, to form one or more facets 1320 with desired size(s), curvature(s), and orientation(s) at desired location(s). After step 3 (operations at block 1230), a hot mirror coating layer 1330 may be formed on the entire top surface of base substrate 1310. After step 4 (operations at block 1240), hot mirror coating layer 1330 at locations where no facets 1320 are formed may be selectively etched away, and facet(s) with coated surfaces 1340 may remain on the top surface of the base substrate. After step 5 (operations at block 1250), a top substrate layer may be formed on the top surface of the base substrate by casting and curing a layer of a material to form a unified substrate 1360, such that one or more hot mirrors 1350 may be embedded in substrate 1360.

Figure 14:
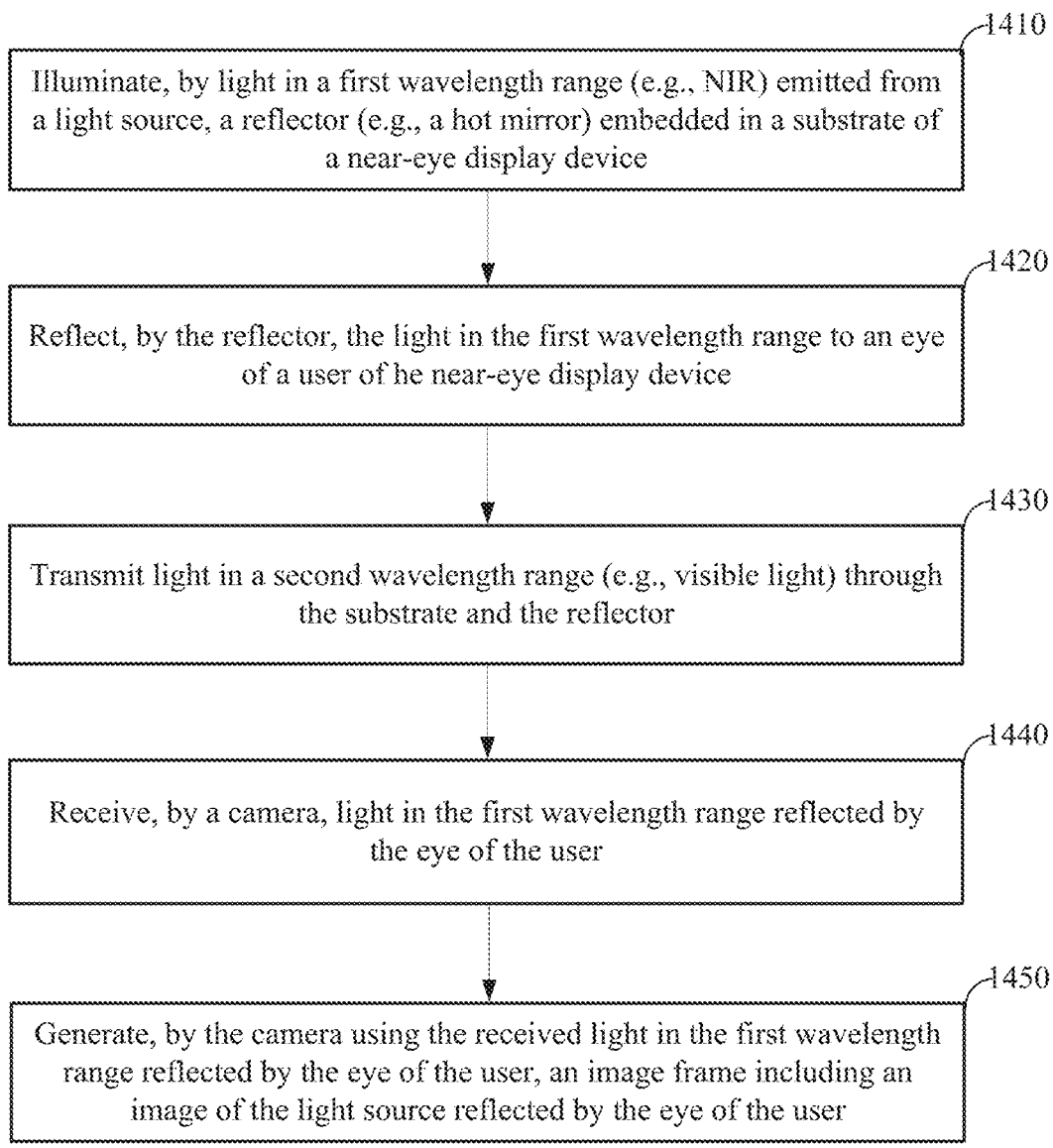
FIG. 14 is a flow chart illustrating an example method of eye illumination for eye tracking in a near-eye display, according to certain embodiments.

FIG. 14 is a flow chart 1400 illustrating an example method of eye illumination for eye tracking in a near-eye display, according to certain embodiments. The method may be performed by, for example, eye-tracking unit 130 in near-eye display 120 of FIG. 1, eye-tracking unit 600 of FIG. 6, and the eye-tracking units described above with respect to FIGS. 8 and 11.

At block 1410, a light source (e.g., a laser or an LED) of an eye-tracking unit in a near-eye display device may emit light in a first wavelength range (e.g., NIR). The light emitted from the light source may illuminate a reflector (e.g., a mirror such as a hot mirror or other dichroic mirror) embedded in a substrate of the eye-tracking unit in the near-eye display device. The reflector may be configured to reflect light in the first wavelength range, while allowing light in a different wavelength range (e.g., visible light) to pass through with little or no loss. The substrate may be transparent to both light in the first wavelength range and light in the second wavelength range. In some embodiments, multiple reflectors may be embedded in the substrate. The multiple reflectors may each be illuminated by the light emitted from the light source. Each of the multiple reflectors may be configured to reflect light in the first wavelength range, while allowing light in a different wavelength range (e.g., visible light) to pass through with little or no loss. The multiple reflectors may be located at different locations within the substrate, and may have different mechanical parameters, such as size, surface curvature, tilted angle, etc.

At block 1420, the reflector may specularly reflect the light in the first wavelength range to an eye of a user of the near-eye display device. In some embodiments, the reflector may also focus or diverge the light when reflecting the light. In embodiments where multiple reflectors are embedded in the substrate, each of the reflectors may reflect the light illuminating the reflector to a same or different area on the eye.

At block 1430, the reflector(s) and the substrate may allow light in a second wavelength range (e.g., visible light) different from the first wavelength range to pass through with little or no loss. Thus, the user may see through the substrate and the reflector(s) as if the reflector(s) did not exist.

At block 1440, a camera of the eye-tracking unit may receive light in the first wavelength range reflected by the eye of the user. The light reflected by the eye of the user may include light specularly reflected by the cornea of the eye and light diffusively reflected or diffracted by features within the eye, such as features on the iris or pupil of the eye.

At block 1450, the camera may generate an image frame including an image of the light source (a "glint") reflected by the eye of the user, by detecting the light reflected from the eye of the user using an image sensor. In embodiments where multiple reflectors are embedded in the substrate, multiple glints may be captured in the captured image frame. The location(s) of the glint(s) in the captured image frame and/or other features in the captured image frame that correspond to features in different areas of the eye may then be used to determine a position of the user's eye as described above.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 15:
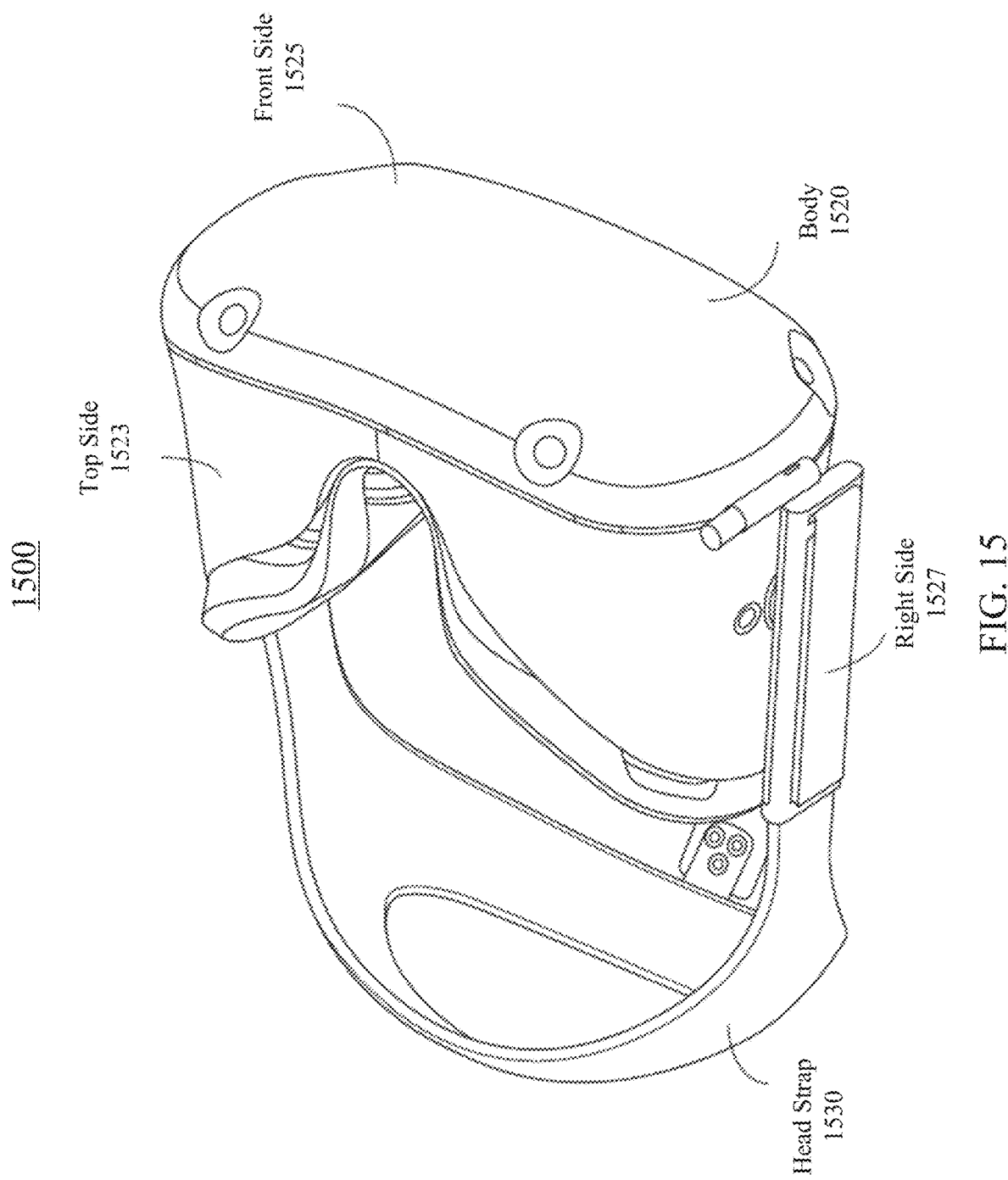
FIG. 15 is a perspective view of an example near-eye display in the form of a head-mounted display (HMD) device for implementing some of the examples disclosed herein.

FIG. 15 is a perspective view of an example near-eye display in the form of a head-mounted display (HMD) device 1500 for implementing some of the example near-eye displays (e.g., near-eye display 120) disclosed herein. HMD device 1500 may be a part of, e.g., a virtual reality (VR) system, an augmented reality (AR) system, a mixed reality (MR) system, or some combinations thereof. HMD device 1500 may include a body 1520 and a head strap 1530. FIG. 15 shows a top side 1523, a front side 1525, and a right side 1527 of body 1520 in the perspective view. Head strap 1530 may have an adjustable or extendible length. There may be a sufficient space between body 1520 and head strap 1530 of HMD device 1500 for allowing a user to mount HMD device 1500 onto the user's head. In various embodiments, HMD device 1500 may include additional, fewer, or different components. For example, in some embodiments, HMD device 1500 may include eyeglass temples and temples tips as shown in, for example, FIGS. 2, 4, 8, and 11, rather than head strap 1530.

HMD device 1500 may present to a user media including virtual and/or augmented views of a physical, real-world environment with computer-generated elements. Examples of the media presented by HMD device 1500 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 15) enclosed in body 1520 of HMD device 1500. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 1500 may include two eye box regions.

In some implementations, HMD device 1500 may include various sensors (not shown), such as depth sensors, motion sensors, position sensors, and eye tracking sensors. Some of these sensors may use a structured light pattern for sensing. In some implementations, HMD device 1500 may include an input/output interface for communicating with a console. In some implementations, HMD device 1500 may include a virtual reality engine (not shown) that can execute applications within HMD device 1500 and receive depth information, position information, acceleration information, velocity information, predicted future positions, or some combination thereof of HMD device 1500 from the various sensors. In some implementations, the information received by the virtual reality engine may be used for producing a signal (e.g., display instructions) to the one or more display assemblies. In some implementations, HMD device 1500 may include locators (not shown, such as locators 126) located in fixed positions on body 1520 relative to one another and relative to a reference point. Each of the locators may emit light that is detectable by an external imaging device.

Figure 16:
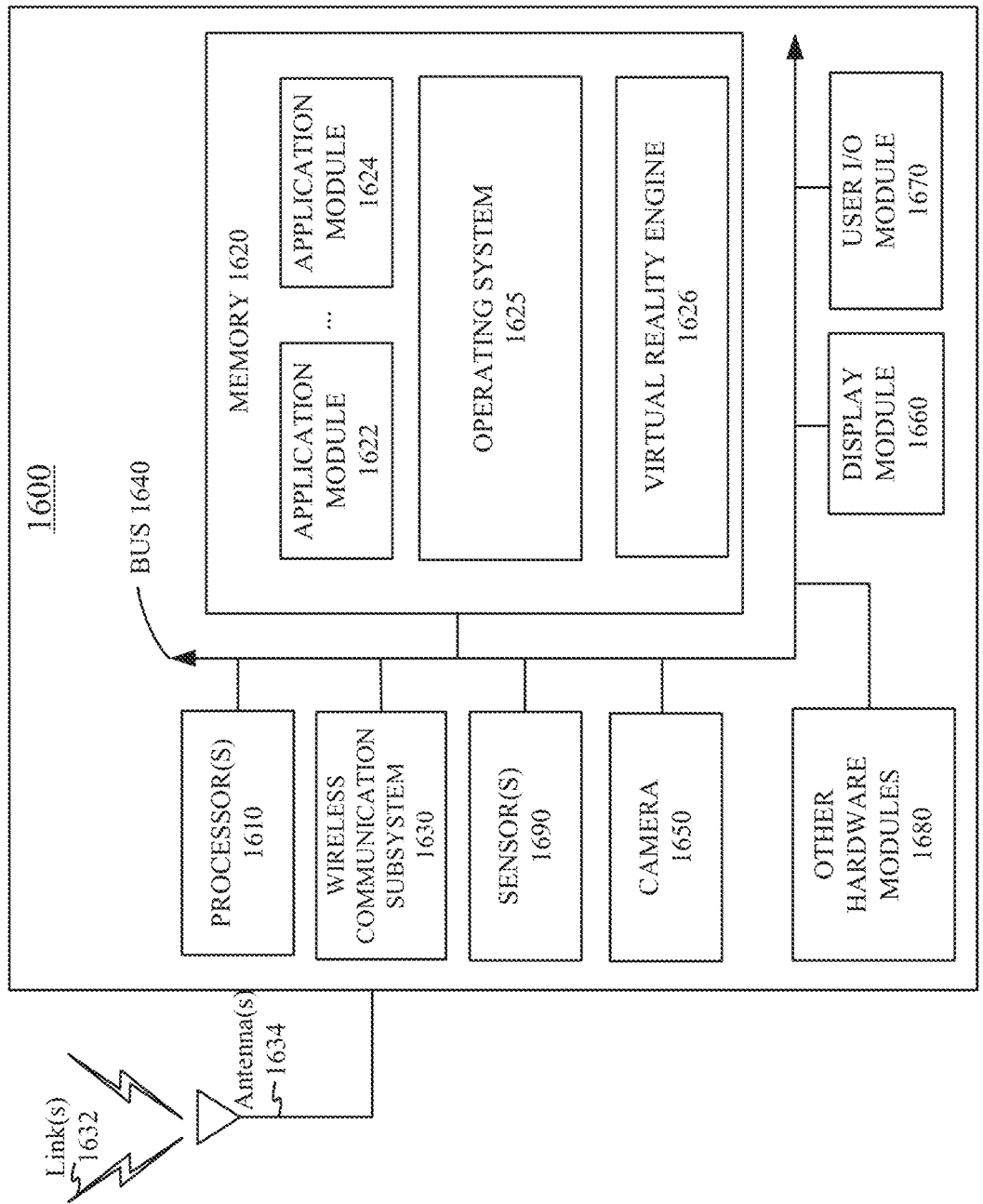
FIG. 16 is a simplified block diagram of an example electronic system of an example near-eye display for implementing some of the examples disclosed herein.

FIG. 16 is a simplified block diagram of an example electronic system 1600 of an example near-eye display (e.g., HMD device) for implementing some of the examples disclosed herein. Electronic system 1600 may be used as the electronic system of HMD device 1500 or other near-eye displays described above. In this example, electronic system 1600 may include one or more processor(s) 1610 and a memory 1620. Processor(s) 1610 may be configured to execute instructions for performing operations at a number of components, and can be, for example, a general-purpose processor or microprocessor suitable for implementation within a portable electronic device. Processor(s) 1610 may be communicatively coupled with a plurality of components within electronic system 1600. To realize this communicative coupling, processor(s) 1610 may communicate with the other illustrated components across a bus 1640. Bus 1640 may be any subsystem adapted to transfer data within electronic system 1600. Bus 1640 may include a plurality of computer buses and additional circuitry to transfer data.

Memory 1620 may be coupled to processor(s) 1610. In some embodiments, memory 1620 may offer both short-term and long-term storage and may be divided into several units. Memory 1620 may be volatile, such as static random access memory (SRAM) and/or dynamic random access memory (DRAM) and/or non-volatile, such as read-only memory (ROM), flash memory, and the like. Furthermore, memory 1620 may include removable storage devices, such as secure digital (SD) cards. Memory 1620 may provide storage of computer-readable instructions, data structures, program modules, and other data for electronic system 1600. In some embodiments, memory 1620 may be distributed into different hardware modules. A set of instructions and/or code might be stored on memory 1620. The instructions might take the form of executable code that may be executable by electronic system 1600, and/or might take the form of source and/or installable code, which, upon compilation and/or installation on electronic system 1600 (e.g., using any of a variety of generally available compilers, installation programs, compression/decompression utilities, etc.), may take the form of executable code.

In some embodiments, memory 1620 may store a plurality of application modules 1622 through 1624, which may include any number of applications. Examples of applications may include gaming applications, conferencing applications, video playback applications, or other suitable applications. The applications may include a depth sensing function or eye tracking function. Application modules 1622-1624 may include particular instructions to be executed by processor(s) 1610. In some embodiments, certain applications or parts of application modules 1622-1624 may be executable by other hardware modules 1680. In certain embodiments, memory 1620 may additionally include secure memory, which may include additional security controls to prevent copying or other unauthorized access to secure information.

In some embodiments, memory 1620 may include an operating system 1625 loaded therein. Operating system 1625 may be operable to initiate the execution of the instructions provided by application modules 1622-1624 and/or manage other hardware modules 1680 as well as interfaces with a wireless communication subsystem 1630 which may include one or more wireless transceivers. Operating system 1625 may be adapted to perform other operations across the components of electronic system 1600 including threading, resource management, data storage control and other similar functionality.

Wireless communication subsystem 1630 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1600 may include one or more antennas 1634 for wireless communication as part of wireless communication subsystem 1630 or as a separate component coupled to any portion of the system. Depending on desired functionality, wireless communication subsystem 1630 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1630 may permit data to be exchanged with a network, other computer systems, and/or any other devices described herein. Wireless communication subsystem 1630 may include a means for transmitting or receiving data, such as identifiers of HMD devices, position data, a geographic map, a heat map, photos, or videos, using antenna(s) 1634 and wireless link(s)

1632. Wireless communication subsystem 1630, processor(s) 1610, and memory 1620 may together comprise at least a part of one or more of a means for performing some functions disclosed herein.

Embodiments of electronic system 1600 may also include one or more sensors 1690. Sensor(s) 1690 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1690 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1600 may include a display module 1660. Display module 1660 may be a near-eye display, and may graphically present information, such as images, videos, and various instructions, from electronic system 1600 to a user. Such information may be derived from one or more application modules 1622-1624, virtual reality engine 1626, one or more other hardware modules 1680, a combination thereof, or any other suitable means for resolving graphical content for the user (e.g., by operating system 1625). Display module 1660 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 1600 may include a user input/output module 1670. User input/output module 1670 may allow a user to send action requests to electronic system 1600. An action request may be a request to perform a particular action. For example, an action request may be to start or end an application or to perform a particular action within the application. User input/output module 1670 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1600. In some embodiments, user input/output module 1670 may provide haptic feedback to the user in accordance with instructions received from electronic system 1600. For example, the haptic feedback may be provided when an action request is received or has been performed.

Electronic system 1600 may include a camera 1650 that may be used to take photos or videos of a user, for example, for tracking the user's eye position. Camera 1650 may also be used to take photos or videos of the environment, for example, for VR, AR, or MR applications. Camera 1650 may include, for example, a complementary metal-oxide-semiconductor (CMOS) image sensor with a few millions or tens of millions of pixels. In some implementations, camera 1650 may include two or more cameras that may be used to capture 3-D images.

In some embodiments, electronic system 1600 may include a plurality of other hardware modules 1680. Each of other hardware modules 1680 may be a physical module within electronic system 1600. While each of other hardware modules 1680 may be permanently configured as a structure, some of other hardware modules 1680 may be temporarily configured to perform specific functions or temporarily activated. Examples of other hardware modules 1680 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1680 may be implemented in software.

In some embodiments, memory 1620 of electronic system 1600 may also store a virtual reality engine 1626. Virtual reality engine 1626 may execute applications within electronic system 1600 and receive position information, acceleration information, velocity information, predicted future positions, or some combination thereof of the HMD device from the various sensors. In some embodiments, the information received by virtual reality engine 1626 may be used for producing a signal (e.g., display instructions) to display module 1660. For example, if the received information indicates that the user has looked to the left, virtual reality engine 1626 may generate content for the HMD device that mirrors the user's movement in a virtual environment. Additionally, virtual reality engine 1626 may perform an action within an application in response to an action request received from user input/output module 1670 and provide feedback to the user. The provided feedback may be visual, audible, or haptic feedback. In some implementations, processor(s) 1610 may include one or more GPUs that may execute virtual reality engine 1626.

In various implementations, the above-described hardware and modules may be implemented on a single device or on multiple devices that can communicate with one another using wired or wireless connections. For example, in some implementations, some components or modules, such as GPUs, virtual reality engine 1626, and applications (e.g., tracking application), may be implemented on a console separate from the head-mounted display device. In some implementations, one console may be connected to or support more than one HMD.

In alternative configurations, different and/or additional components may be included in electronic system 1600. Similarly, functionality of one or more of the components can be distributed among the components in a manner different from the manner described above. For example, in some embodiments, electronic system 1600 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. An illuminator for eye tracking comprising:
a light source;
a substrate configured to be placed in front of an eye of a user, the substrate comprising a first surface facing the eye; and
a plurality of reflectors fixed within the substrate,
wherein:
the light source is configured to emit light in a first wavelength range to impinge on the first surface from outside of the substrate, thereby illuminating each reflector of the plurality of reflectors;
each reflector of the plurality of reflectors is configured to reflect the impinging light in the first wavelength range to the eye of the user such that each reflector of the plurality of reflectors forms a corresponding image of the light source, wherein different images of the light source formed by different reflectors of the plurality of reflectors are disposed at different locations in front of the eye, and to transmit light in a second wavelength range different from the first wavelength range;
the substrate is transparent to both the light in the first wavelength range and the light in the second wavelength range; and
each reflector of the plurality of reflectors is different in size and surface curvature from other reflectors of the plurality of reflectors.

2. The illuminator of claim 1, wherein:
the first wavelength range is a near infrared range;
the second wavelength range is a visible range for a human eye; and
the plurality of reflectors comprises at least one hot mirror, the at least one hot mirror configured to reflect light in the near infrared range and transmit light in the visible range.

3. The illuminator of claim 1, wherein:
each reflector of the plurality of reflectors comprises a reflecting surface; and
the light source is configured to directly illuminate the reflecting surface of each reflector from outside of the substrate.

4. The illuminator of claim 3, wherein the reflecting surface comprises a flat surface, a concave surface, a convex surface, a cylindrical surface, an aspherical surface, or a freeform surface.

5. The illuminator of claim 3, wherein the plurality of reflectors comprises a plurality of dielectric layers, a diffractive optical element, or a reflective material layer at the reflecting surface.

6. The illuminator of claim 1, wherein each reflector of the plurality of reflectors is configured to reflect the light in the first wavelength range from the light source to a different area of the eye.

7. The illuminator of claim 2, wherein:
each reflector of the plurality of reflectors comprises a reflecting surface; and
the reflecting surface of each reflector of the plurality of reflectors is configured such that a virtual image of the light source formed by the reflecting surface of each reflector of the plurality of reflectors is at a different location in front of the eye of the user.

8. The illuminator of claim 1, wherein the substrate comprises a curved surface.

9. The illuminator of claim 1, wherein the substrate comprises at least one of a glass, quartz, plastic, polymer, ceramic, or crystal.

10. The illuminator of claim 1, wherein the light source comprises a laser, a light-emitting diode, or a lamp.

11. An eye-tracking unit for a near-eye display device, the eye-tracking unit comprising:
a light source;
a camera;
a substrate configured to be placed in front of an eye of a user; and
a plurality of reflectors fixed within the substrate,
wherein:
the light source is configured to emit light in a first wavelength range to impinge on the first surface from outside of the substrate, thereby illuminating each reflector of the plurality of reflectors;
each reflector of the plurality of reflectors is configured to reflect the impinging light in the first wavelength range to the eye of the user such that each reflector of the plurality of reflectors forms a corresponding image of the light source, wherein different images of the light source formed by different reflectors of the plurality of reflectors are disposed at different locations in front of the eye, and to transmit light in a second wavelength range from a display panel of the near-eye display device to the eye of the user;
the camera is configured to receive light in the first wavelength range and reflected by the eye of the user;
the substrate is transparent to both the light in the first wavelength range and the light in the second wavelength range; and
each reflector of the plurality of reflectors is different in size and surface curvature from other reflectors of the plurality of reflectors.

12. The eye-tracking unit of claim 11, wherein the light source and the camera are coupled to or embedded in a body of the near-eye display device.

13. The eye-tracking unit of claim 11, wherein the substrate is a part of the display panel of the near-eye display device.

14. The eye-tracking unit of claim 11, wherein:
the light source is configured to directly illuminate the plurality of reflectors with the light in the first wavelength range from outside of the substrate; and
each reflector of the plurality of reflectors is configured to reflect the light in the first wavelength range from the light source to a different area of the eye.

15. The eye-tracking unit of claim 11, further comprising an imaging reflector located within the substrate, the imaging reflector configured to:
receive light in the first wavelength range reflected by the eye of the user;
reflect the light in the first wavelength range reflected by the eye of the user to the camera; and
transmit the light in the second wavelength range from the display panel of the near-eye display device to the eye of the user.

16. A method of tracking an eye of a user of a near-eye display, the method comprising:
illuminating, by light in a first wavelength range emitted by a light source, a plurality of reflectors fixed within a substrate in front of the eye of the user, wherein the light in the first wavelength range illuminates a first surface of the substrate facing the eye from outside of the substrate, thereby illuminating each reflector of the plurality of reflectors comprising a first reflector;

reflecting, by each reflector of the plurality of reflectors, the light in the first wavelength range towards the eye of the user at a different angle for each reflector, such that each reflector of the plurality of reflectors forms a corresponding image of the light source, wherein different images of the light source formed by different reflectors of the plurality of reflectors are disposed at different locations in front of the eye; and transmitting light in a second wavelength range from a display panel of the near-eye display through the substrate and the plurality of reflectors and to the eye of the user;

wherein each reflector of the plurality of reflectors is different in size and surface curvature from other reflectors of the plurality of reflectors.

17. The method of claim 16, further comprising:
receiving, by a camera, light in the first wavelength range reflected by the eye of the user; and
generating, by the camera using the received light in the first wavelength range reflected by the eye of the user, an image frame comprising a plurality of images of the light source reflected by the eye of the user, each image corresponding to a different reflector of the plurality of reflectors.

18. The method of claim 16, further comprising:
receiving, by a second reflector within the substrate, light in the first wavelength range reflected by the eye of the user;
reflecting, by the second reflector, the received light in the first wavelength range reflected by the eye of the user, to a camera; and
transmitting the light in the second wavelength range from the display panel of the near-eye display through the substrate and the second reflector and to the eye of the user.

19. The method of claim 16, further comprising:
directly illuminating, by the light in the first wavelength range emitted from the light source, a third reflector of the plurality of reflectors within the substrate, wherein the first reflector reflects light to a first area of the eye of the user;
reflecting, by the third reflector, the light in the first wavelength range to a second, different area of the eye of the user; and
transmitting the light in the second wavelength range from the display panel of the near-eye display through the substrate and the third reflector to the eye of the user.

* * * * *